(12) United States Patent
Uemura et al.

(10) Patent No.: US 9,709,853 B2
(45) Date of Patent: Jul. 18, 2017

(54) LIQUID CRYSTAL DISPLAY PANEL

(71) Applicant: Japan Display Inc., Tokyo (JP)

(72) Inventors: Norihiro Uemura, Tokyo (JP);
Hidekazu Miyake, Tokyo (JP); Isao Suzumura, Tokyo (JP); Yohei Yamaguchi, Tokyo (JP); Toshiki Kaneko, Tokyo (JP)

(73) Assignee: Japan Display Inc., Tokyo (JP)

( * ) Notice: Subject to any disclaimer, the term of this patent is extended or adjusted under 35 U.S.C. 154(b) by 66 days.

(21) Appl. No.: 14/480,804

(22) Filed: Sep. 9, 2014

(65) Prior Publication Data
US 2015/0070641 A1 Mar. 12, 2015

(30) Foreign Application Priority Data
Sep. 12, 2013 (JP) .................................. 2013-189276

(51) Int. Cl.
*G02F 1/1345* (2006.01)
*G02F 1/1337* (2006.01)
*G02F 1/1362* (2006.01)
*G02F 1/1333* (2006.01)

(52) U.S. Cl.
CPC .. *G02F 1/133788* (2013.01); *G02F 1/136209* (2013.01); *G02F 2001/133388* (2013.01)

(58) Field of Classification Search
CPC ............. G02F 1/133788; G02F 1/1368; G02F 1/136209; G02F 2001/133388
USPC ........................................................ 349/149
See application file for complete search history.

(56) References Cited

U.S. PATENT DOCUMENTS

| 2011/0242468 A1* | 10/2011 | Choi ..................... C08G 8/12 349/129 |
| 2012/0224131 A1 | 9/2012 | Kunimatsu et al. |
| 2012/0326951 A1* | 12/2012 | Yamazaki ............. G02F 1/1345 345/76 |
| 2013/0196565 A1* | 8/2013 | Miyake ................. G02F 1/1337 445/25 |
| 2014/0022479 A1* | 1/2014 | Hosaka ................. G02F 1/1368 349/43 |

FOREIGN PATENT DOCUMENTS

JP 2012-181447 A 9/2012

* cited by examiner

*Primary Examiner* — Charles Chang
(74) *Attorney, Agent, or Firm* — Typha IP LLC

(57) ABSTRACT

To maintain good operation of a peripheral circuit using an oxide thin film transistor in a liquid crystal display panel to which photo alignment is applied, the liquid crystal display panel includes: a transparent substrate provided with an oxide thin film transistor in the periphery of a pixel portion in which pixel electrodes are arranged, to control the pixel electrodes; and an alignment film to align liquid crystal provided in the pixel portion. The alignment film is subjected to photo alignment treatment by ultraviolet irradiation. Further, an ultraviolet absorbing layer is provided so as to cover the oxide thin film transistor. For example, an alignment film is used for the ultraviolet absorbing layer to absorb the ultraviolet light for the photo aliment treatment of the alignment film, in the peripheral circuit portion for controlling the pixel electrodes, thereby preventing the threshold voltage of the oxide thin film transistor from shifting.

9 Claims, 21 Drawing Sheets

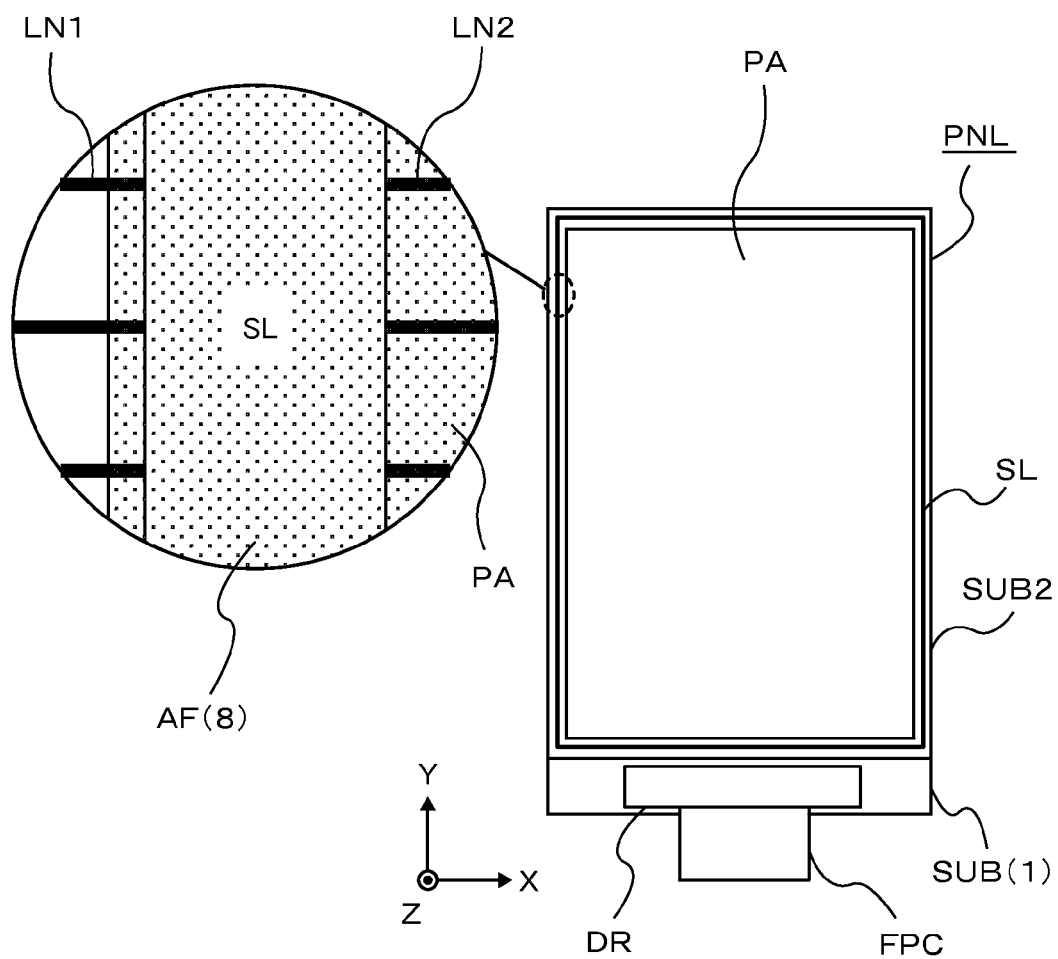

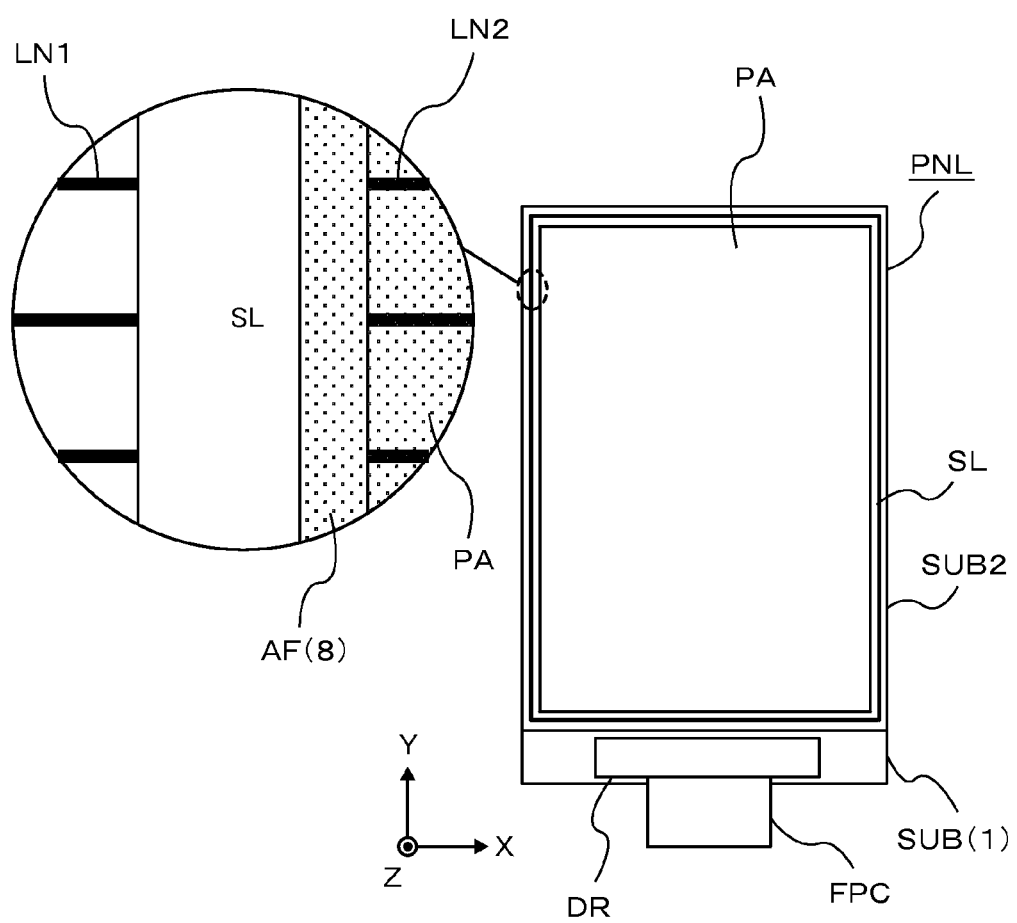

LIQUID CRYSTAL DISPLAY PANEL

CLAIM OF PRIORITY

The present application claims priority from Japanese Patent Application JP 2013-189276 filed on Sep. 12, 2013, the content of which is hereby incorporated by reference into this application.

BACKGROUND

The present invention relates to a liquid crystal display panel, and more particularly, to a liquid crystal display panel in which an oxide thin film transistor using an oxide semiconductor for a semiconductor layer is provided in the periphery of a pixel portion of the liquid crystal display panel, as a thin film transistor (TFT) to control pixel electrodes.

For example, liquid crystal display devices using liquid crystal display panels are used as display devices for various portable information devices such as mobile phones, portable information terminals (PDAs), digital cameras, and multimedia players, or for display devices of television and personal computers.

In the field of such liquid crystal display panels, liquid crystal display panels using oxide thin film transistors (oxide TFTs) have attracted attention as a means for achieving high definition.

Compared to amorphous silicon TFT (a-SiTFT), oxide TFT is a thin film transistor with high mobility and performance by substantially the same process. However, it is important to control the threshold voltage and to prevent the time-dependent degradation of TFT characteristics.

Further, there is a method called photo alignment to apply an alignment treatment to an alignment film used for the liquid crystal display panel. In other words, the photo alignment is a method for providing an alignment control function to the alignment film. By using the photo aliment method, for example, it is possible to suppress light leakage and increase the contrast of a display image.

However, a problem arises when the photo alignment is applied in the liquid crystal display panel using an oxide TFT. More specifically, when ultraviolet light is irradiated onto the oxide TFT, defects are generated in the semiconductor layer, which results in a shift of the threshold voltage. In addition, there is also a problem that the defects accelerate the time-dependent degradation of TFT characteristics.

Such threshold voltage shift and time-dependent degradation of TFT characteristics may be a problem particularly in the oxide TFT applied to the peripheral circuit to control the pixel electrodes, rather than in the oxide TFT applied to the pixel electrodes. In the peripheral circuit, a small threshold voltage shift and time-dependent degradation of TFT characteristics may cause a problem in the normal circuit operation, namely, in the normal image display.

For example, an oxide TFT of In, Ga, Zn, and O, (for example, the band gap of IGZO is about 3 to 3.2 eV), absorbs ultraviolet light. For example, when a mercury lamp is used for photo alignment, ultraviolet light with wavelengths of 254 nm, 313 nm, 365 nm, 405 nm, 436 nm, and the like are irradiated onto the IGZO layer to form defect levels in the semiconductor layer. At this time, if the defect levels are of donor type, the threshold voltage is depleted. In addition, increasing such defect levels accelerates the time-dependent degradation of TFT characteristics.

For example, in the oxide TFT configuring a peripheral circuit such as a gate scanning circuit or a selector circuit, if the threshold voltage shifts in the negative direction (and is depleted), a problem arises that the peripheral circuit fails to perform the off operation and would not operate normally.

Japanese Patent Application Laid-Open No. 2012-181447 describes an invention in which an ultraviolet absorbing layer is formed in a counter substrate, to absorb ultraviolet light causing degradation of an alignment film that is subjected to photo alignment treatment in a TFT substrate, by the ultraviolet absorbing layer, in the process of curing the resin with ultraviolet light to bond the counter substrate and the TFT substrate, in order to prevent the alignment film from being damaged by the ultraviolet light.

SUMMARY

An object of the present invention is to maintain good operation of a peripheral circuit using an oxide thin film transistor in a liquid crystal display panel to which photo alignment is applied.

The liquid crystal display panel according to the present invention has the following technical features:

(1) A liquid crystal display panel includes: a transparent substrate provided with an oxide thin film transistor in the periphery of a pixel portion in which pixel electrodes are arranged, to control the pixel electrodes; and an alignment film to align a liquid crystal provided in the pixel portion. The alignment film is subjected to a photo alignment treatment by irradiation with ultraviolet light. Further, an ultraviolet absorbing layer for absorbing the ultraviolet light is provided so as to cover the oxide thin film transistor.

(2) In the liquid crystal display panel described in (1), the ultraviolet absorbing layer is formed by a transparent electrode formed in the same lamination process as the transparent electrode provided in the pixel portion.

(3) In the liquid crystal display panel described in (2), the pixel electrode is configured by an oxide thin film transistor, and the ultraviolet absorbing layer is formed by an oxide based transparent electrode material.

(4) In the liquid crystal display panel described in (2) or (3), the pixel electrode is configured by an oxide thin film transistor, and the ultraviolet absorbing layer is formed by the same lamination process as a transparent electrode provided in the pixel portion, independent of the transparent electrode of the oxide thin film transistor configuring the pixel electrode.

(5) In the liquid crystal display panel described in (1), the ultraviolet absorbing layer is formed by an alignment film material formed in the same lamination process as the alignment film provided in the pixel portion.

(6) In the liquid crystal display panel described in (5), the pixel electrode is configured by an oxide thin film transistor, and the alignment film of the pixel portion is provided above the oxide thin film transistor through a protective layer.

(7) In the liquid crystal display panel described in (5) or (6), the pixel electrode is configured by an oxide thin film transistor, and the alignment film of the pixel portion is provided above the oxide thin film transistor through an organic flattening layer.

(8) In the liquid crystal display panel described in (7), the alignment film of the pixel portion is provided above the oxide thin film transistor, through an organic flattening layer and an inter-layer capacitive film.

(9) In the liquid crystal display panel described in (1), the ultraviolet absorbing layer is formed by the laminated layer of the transparent electrode and the alignment film.

According to the present invention, it is possible to maintain good operation of a peripheral circuit using an oxide TFT in a liquid crystal display panel to which photo alignment is applied.

Further, it is possible to maintain excellent driving capability of the oxide TFT, and thus achieve a high definition liquid crystal display panel, which is difficult to be realized by amorphous silicon TFT (a-Si TFT), by substantially the same process and cost as producing a-Si TFT. In addition, the use of photo alignment makes it possible to achieve an image display device with excellent contrast.

BRIEF DESCRIPTION OF THE DRAWINGS

FIGS. 1A and 1B are views of a liquid crystal display panel according to an embodiment of the present invention, in which FIG. 1A is a plan view of the liquid crystal display panel, and FIG. 1B is an enlarged view of a peripheral circuit portion of the liquid crystal display panel;

FIGS. 2A and 2B are views of a liquid crystal display panel according to a conventional example, in which FIG. 2A is a plan view of the liquid crystal display panel, and FIG. 2B is an enlarged view of a peripheral circuit portion of the liquid crystal display panel;

FIGS. 3A and 3B are views of an oxide TFT of the peripheral circuit according to a first embodiment of the present invention, in which FIG. 3A is a plan view of the oxide TFT and FIG. 3B is a cross-sectional view of the oxide TFT;

FIGS. 4A and 4B are views of an oxide TFT of the peripheral circuit according to the conventional example, in which FIG. 4A is a plan view of the oxide TFT and FIG. 4B is a cross-sectional view of the oxide TFT;

FIGS. 13A and 13B are views of an oxide TFT of the peripheral circuit according to a second embodiment of the present invention, in which FIG. 13A is a plan view of the oxide TFT and FIG. 13B is a cross-sectional view of the oxide TFT;

FIGS. 14A and 14B are views of an oxide TFT of the peripheral circuit portion according to the conventional example, in which FIG. 14A is a plan view of the oxide TFT and FIG. 14B is a cross-sectional view of the oxide TFT;

FIGS. 26A and 26B are views of a liquid crystal panel according to an embodiment of the present invention, in which FIG. 26A is a plan view of the liquid crystal panel and FIG. 26B is an enlarged view of the peripheral circuit portion of the liquid crystal panel;

FIGS. 35A and 35B are views of an oxide TFT of the peripheral circuit according to an eleventh embodiment of the present invention, in which FIG. 35A is a plan view of the oxide TFT and FIG. 35B is a cross-sectional view of the oxide TFT;

FIGS. 36A and 36B are views of an oxide TFT of the peripheral circuit according to a twelfth embodiment of the present invention, in which FIG. 36A is a plan view of the oxide TFT and FIG. 36B is a cross-sectional view of the oxide TFT.

DETAILED DESCRIPTION

Figure 3A:
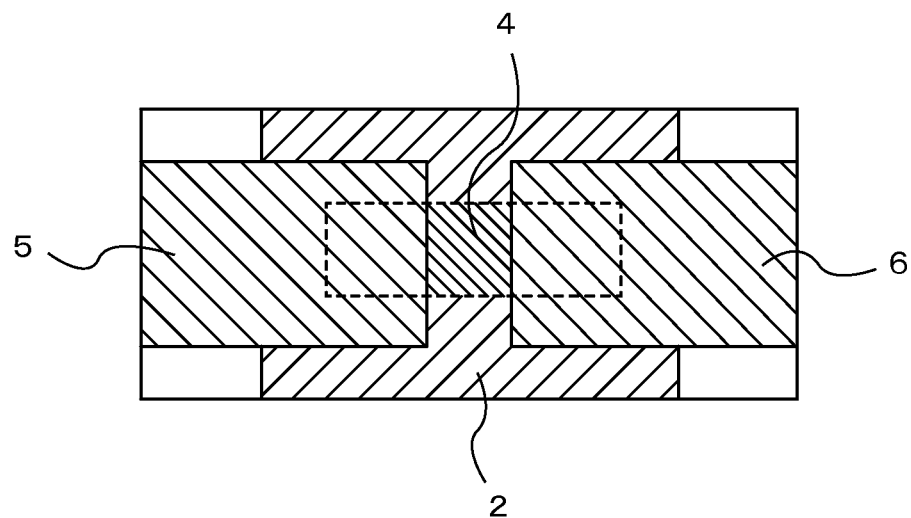

A liquid crystal display panel according to the present invention will be described in detail with reference to preferred embodiments.

The present invention will now be described with reference to various embodiments. First, the common features of the embodiments will be described.

Note that the embodiments described below use a bottom gate type transistor. However, the present invention is not limited to these embodiments, and can be applied to liquid crystal display panels using various types of oxide TFTs.

Further, the embodiments described below use a photo alignment film and a transparent electrode as an ultraviolet absorbing layer. However, the present invention is also applicable to a structure in which the ultraviolet absorbing layer is formed by various materials having ultraviolet absorbing capability.

FIG. 1A shows a plan view of a liquid crystal display panel according to an embodiment of the present invention. FIG. 1B shows an enlarged view of a peripheral circuit portion of the liquid crystal display panel.

Further, in order to clarify the features of the present embodiment, FIG. 2A shows a plan view of a liquid crystal display panel according to a conventional example, and FIG. 2B shows an enlarged view of a peripheral circuit portion of the liquid crystal display panel.

As shown in FIGS. 1A to 2B, the structure of a liquid crystal display panel PNL is such that liquid crystal is injected into the space between a pair of transparent substrates SUB1 and SUB2 with an alignment film AF interposed therebetween. The transparent substrate SUB1 is provided with a large number of pixel electrodes for driving the liquid crystal, and the other transparent substrate SUB2 is provided with color filters. Further, one end of the transparent substrate SUB1 is provided with a driver DR for driving the pixel electrodes as well as a flexible wiring substrate FPC in which lines are formed.

The alignment film AF is subjected to an alignment treatment by irradiation with ultraviolet light, in order to align liquid crystal molecules with no voltage applied.

Further, the liquid crystal display panel PNL is provided with a peripheral circuit portion SL in the periphery of the pixel portion in which a large number of pixel electrodes are arranged, in order to control the pixel electrodes.

The peripheral circuit portion SL is formed by using an oxide thin film transistor. The pixel electrodes configuring the pixel portion PA are controlled by the operation of the oxide TFT.

Here, a known circuit such as a gate operation circuit or selector circuit is provided for the peripheral circuit portion SL.

Further, in the present embodiment, it is assumed that the TFT configuring the pixel electrodes is also an oxide TFT. However, the present invention is also applicable to various thin film transistors such as amorphous silicon TFT for the TFT of the pixel portion PA.

The provision of the alignment film AF aims to align the liquid crystal, so that the alignment film AF is provided over the entire range of the pixel portion PA.

Thus, the conventional liquid crystal display panel PNL was such that, as shown in FIGS. 2A and 2B, the alignment film AF did not actively cover the peripheral circuit portion SL provided in the periphery of the pixel portion PA for manufacturing or other reasons, even if the alignment film AF has slightly stuck out of the pixel portion PA.

On the other hand, in the liquid crystal display panel PNL according to the present embodiment, the alignment film AF covering the pixel portion PA also covers the entire range of the peripheral circuit portion SL as shown in FIGS. 1A and 1B.

Because of this structure, even when the ultraviolet light, which is irradiated onto the alignment film AF of the pixel portion PA for the photo alignment treatment, is also irradiated onto the peripheral circuit portion SL, the alignment film AF absorbs the ultraviolet light to prevent the ultraviolet light from affecting the oxide TFT configuring the peripheral circuit portion SL. In other words, the alignment film AF functions as a protective layer that protects the oxide TFT of the peripheral circuit portion SL from the ultraviolet light.

Note that in the present embodiment, the aliment film AF is provided over the entire range of the peripheral circuit portion SL. However, according to the present invention, the alignment film AF can be provided in a range covering at least the oxide TFT to be protected.

First Embodiment

Figure 3B:
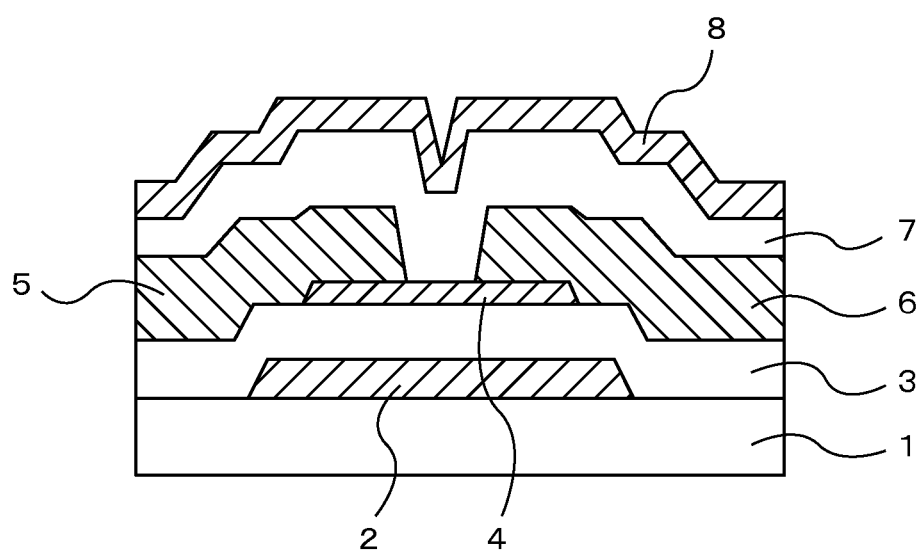
Figure 4A:
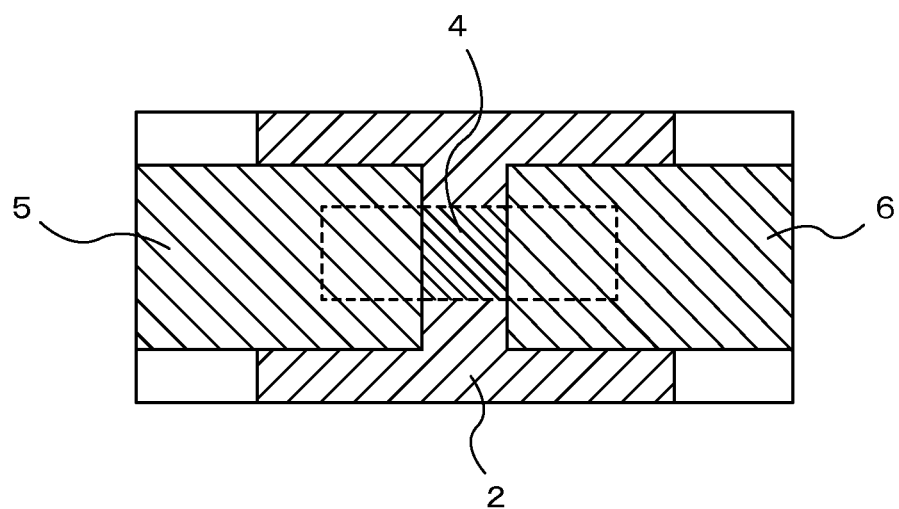
Figure 4B:
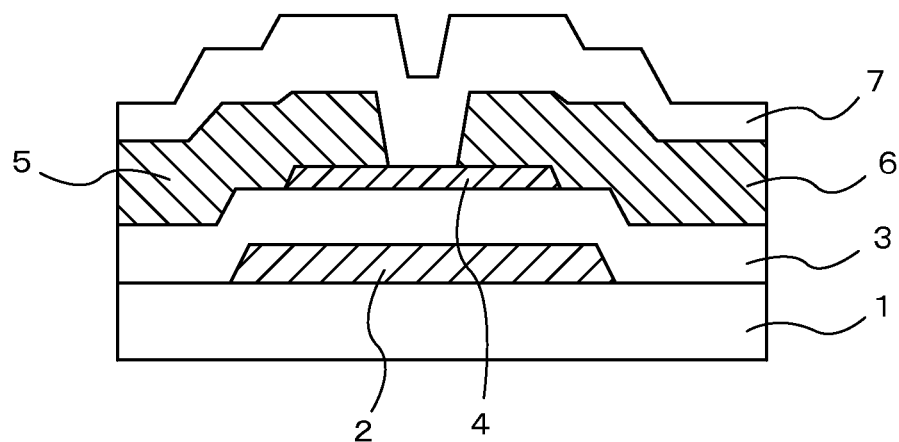

FIGS. 3A and 3B show an oxide TFT of the peripheral circuit portion SL according to a first embodiment of the present invention, and FIGS. 4A and 4B show an oxide TFT of the peripheral circuit portion SL according to a conventional example. Note that FIGS. 3A and 4A are plan views of the oxide TFT, and FIGS. 3B and 4B are cross-sectional views of the oxide TFT, respectively.

The main difference between FIGS. 3A, 3B and FIGS. 4A, 4B is whether the oxide TFT configuring the peripheral circuit portion (a gate scanning circuit in this example) SL is covered by an alignment film 8. Most of the other configurations are the same in FIGS. 3A, 3B and FIGS. 4A, 4B.

A gate electrode 2 is formed on a glass substrate 1 (SUB1 in FIGS. 1A and 2A), and a gate insulating film 3 is formed so as to cover the gate electrode 2. Then, an oxide semiconductor layer 4 is formed on the gate insulating film 3.

Further, a source electrode 5 and a drain electrode 6 are formed so as to cover the oxide semiconductor layer 4, and at the same time, come into contact with the oxide semiconductor layer 4. Then, a protective layer 7 is formed over these layers.

Note that in the present embodiment, a glass substrate is used as a transparent substrate (TFT substrate) in which the TFT is formed. However, the present invention is also applicable to various transparent substrates such as a transparent plastic substrate.

Then, as shown in FIG. 3B, an alignment film 8 (AF in FIG. 1B) is also formed so as to cover the protective layer 7 in the oxide TFT according to the present embodiment. In other words, the oxide semiconductor layer 4 is covered by the alignment film 8.

Note that although the gate insulating film 3, the protective layer 7, and the alignment film 8 are formed over the entire surface, these components are omitted in FIG. 3A and FIG. 4A to clearly show the structure.

The gate insulating film 3 is formed, for example, from an insulating film such as a silicon oxide film, silicon nitride film, or silicon oxide nitride film.

Further, the gate insulating film 3 may have a laminated structure, or may be a combination of any of the insulating films described above. In such cases, the layer contacting the oxide semiconductor layer 4 should be formed from a silicon oxide film.

The film thickness of the gate insulating film 3 can be set to an optimum value, for example, in the range of 100 to 1000 nm, by taking into account the withstand voltage and capacity.

For example, the gate electrode 2, the source electrode 5, and the drain electrode 6 are formed from an element selected from the group of aluminum, molybdenum, chrome, copper, tungsten, titanium, zirconium, tantalum, silver, and manganese, or from an alloy by combining these elements. Further, it is also possible to have a laminated structure, such as laminating aluminum on titanium, or interposing titanium between the upper and lower layers.

For example, the oxide semiconductor layer 4 is an In—Ga—Zn—O based oxide semiconductor that contains indium, gallium, zinc, and oxygen as main components, which is also referred to as an IGZO film. There are also other oxide based materials that can be used as the oxide semiconductor, such as In—Al—Zn—O based, In—Sn—Zn—O based, In—Zn—O based, In—Sn—O based, Zn—O based, and Sn—O based materials.

The film thickness of the oxide semiconductor is, for example, in the range of 30 to 500 nm. The film thickness can be adjusted according to the use. For example, it is possible to increase the film thickness when the oxide semiconductor is used for a device requiring large current.

The protective layer 7 is formed, for example, from an insulating film such as a silicon oxide film, silicon nitride film, or silicon oxide nitride film. The protective layer 7 may have a laminated structure, or may be a combination of any of the insulating films described above.

The alignment film 8 is formed by using a high-polymer material capable of being subjected to an alignment treatment by irradiation with ultraviolet light. Various materials can be used as long as the alignment treatment can be performed by irradiation with ultraviolet light.

Next, the production process of the oxide TFT according to the present embodiment will be described with reference to FIGS. 5 to 12.

Figure 5:
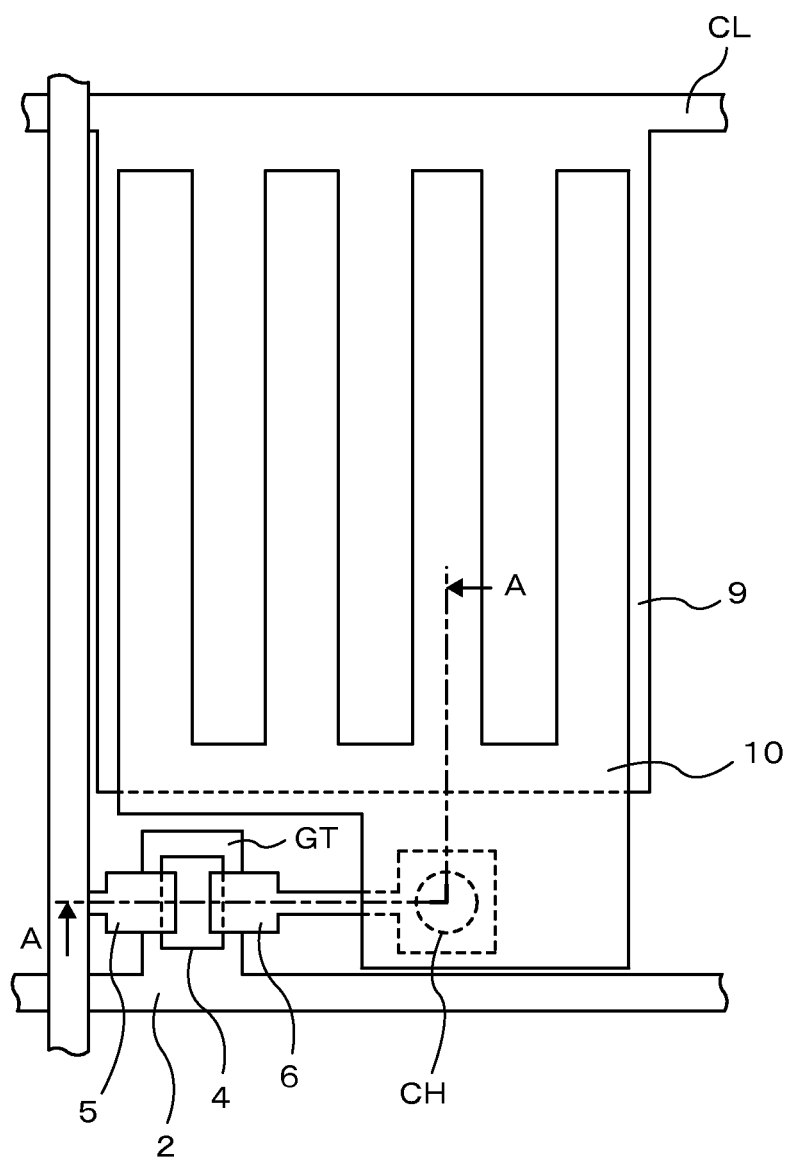
FIG. 5 is a view of the structure of a sub-pixel portion of a TFT substrate according to an embodiment of the present invention.

FIG. 5 shows the structure of a sub pixel in the pixel portion PA of the TFT substrate. FIGS. 6 to 12 show the production process of the A-A cross-sectional structure.

Here, the present invention relates to the structure of the peripheral circuit portion SL, in which the oxide TFT of the peripheral circuit portion SL is formed by the same process as the oxide TFT of the pixel portion PA. Thus, it is described using the production process of the pixel portion PA for a better understanding of the whole process. Further, the description of the structure of the peripheral circuit portion SL is added as well.

The oxide TFT of a sub pixel electrode GT in the pixel portion PA has the structure shown in FIG. 5. For example, a first transparent electrode 9 and a second transparent electrode 10, which are used as an earth electrode and a floating electrode, are provided according to the structure of the TFT. Note that reference symbol CH in FIG. 5 represents a contact hole for providing conduction.

The production process of the oxide TFT includes the formation process of the gate electrode 2, the formation process of the gate insulating film 3, the formation process of the oxide semiconductor layer 4, the formation process of the first transparent electrode 9, the formation process of the source electrode 5 and the drain electrode 6, the formation process of the protective layer 7, the formation process of the second transparent electrode 10, and the formation process of the alignment film 8.

Figure 6:
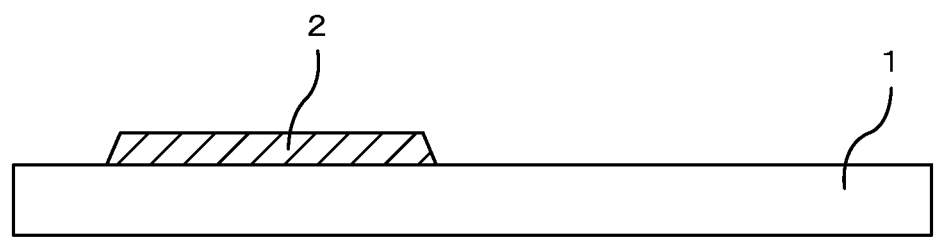
FIG. 6 is a view of a production process according to the first embodiment of the present invention, showing a cross-sectional view corresponding to the line A-A of FIG. 5.

The gate electrode 2 is formed on the glass substrate 1 as shown in FIG. 6.

This formation process is performed, for example, by the following steps.

A metal conductive film such as a molybdenum film, tungsten film, or aluminum film is deposited by sputtering on the glass substrate 1. Next, a photosensitive polymer film is applied on the metal conductive film, which is then developed and patterned to form a resist pattern. After that, the metal conductive film exposed from the resist pattern is removed by wet etching or dry etching. Then, the resist pattern is removed to form the gate electrode 2.

Because of this formation process, the gate electrode 2 of the oxide TFT configuring the peripheral circuit is formed on the glass substrate 1 also in the peripheral circuit portion SL in a similar way (see FIGS. 3A and 3B).

Note that although in the present embodiment the gate electrode 2 is formed on the glass substrate 1, a silicon nitride film can be formed on the glass substrate and then the gate electrode is formed on the silicon nitride film, in order to prevent alkali ions or other substances from entering from the glass substrate. Further, instead of the glass substrate, it is also possible to use a flexible substrate that can endure the thermal process of the TFT.

Figure 7:
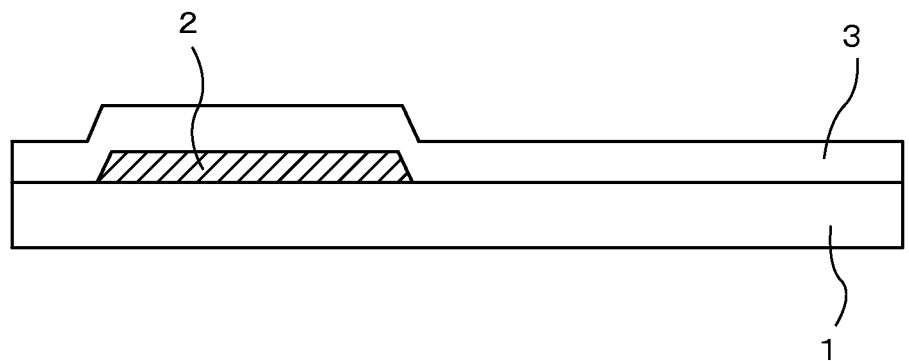
FIG. 7 is a view of the production process according to the first embodiment of the present invention, showing a cross-sectional view corresponding to the line A-A of FIG. 5.

Next, the gate insulating film 3 covering the gate electrode 2 is formed as shown in FIG. 7.

This process is performed, for example, by the following steps.

The gate insulating film 3 is formed by depositing an insulating film such as a silicon oxide film, silicon nitride film, or silicon oxide nitride film by a plasma chemical vapor deposition (CVD) method, on the glass substrate 1 in which the gate electrode 2 is formed.

Because of this formation process, the gate insulating film 3 of the oxide TFT configuring the peripheral circuit is formed also in the peripheral circuit portion SL in a similar way (see FIGS. 3A and 3B).

Figure 8:
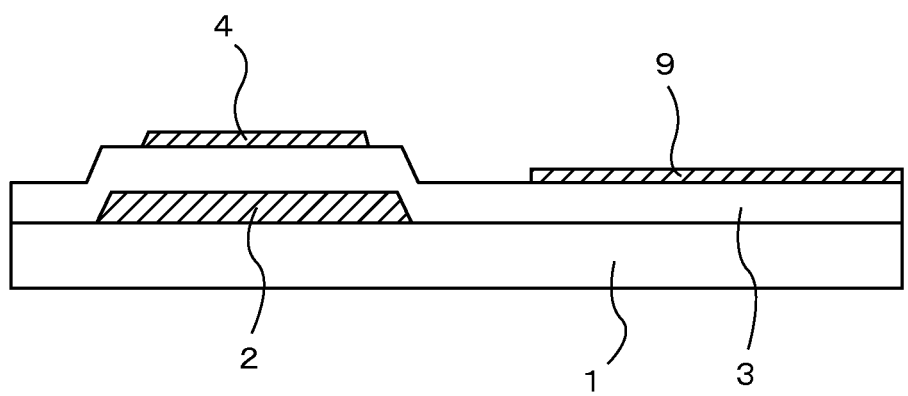
FIG. 8 is a view of the production process according to the first embodiment of the present invention, showing a cross-sectional view corresponding to the line A-A of FIG. 5.

Next, the oxide semiconductor layer 4 is formed on the gate insulating film 3 as shown in FIG. 8.

This formation process is performed, for example, by the following steps.

An oxide semiconductor such as an In—Ga—Zn—O based, In—Al—Zn—O based, In—Sn—Zn—O based, In—Zn—O based, In—Sn—O based, Zn—O based, or Sn—O based oxide semiconductor is deposited by sputtering on the glass substrate 1 in which the gate insulating film 3 is formed. Next, a photosensitive polymer film is applied on the oxide semiconductor film, which is then developed and patterned to form a resist pattern. After that, the oxide semiconductor film exposed from the resist pattern is removed by wet etching. Then, the resist pattern is removed to form the oxide semiconductor layer 4.

Note that it is possible to form an oxide semiconductor layer with fewer oxygen defects, by applying the plasma process using oxygen and dinitrogen monoxide to the oxide semiconductor layer 4.

Further, the first transparent electrode 9 is formed on the gate insulating film 3.

This formation process is performed, for example, by the following steps.

An oxide layer such as an In—Sn—O based, In—Zn—O based, or Zn—O based oxide layer is deposited by sputtering. Next, a photosensitive polymer film is applied on the oxide layer, which is then developed and patterned to form a resist pattern. After that, the oxide layer exposed from the resist pattern is removed by etching. Then, the resist pattern is removed to form the first transparent electrode 9.

Note that after the above process, the oxide semiconductor layer 4 and the first transparent electrode 9 may be stabilized by a calcination process.

Because of this formation process, the oxide semiconductor layer 4 of the oxide TFT configuring the peripheral circuit is formed also in the peripheral circuit portion SL in a similar way (see FIGS. 3A and 3B).

Here, although in the above example the oxide semiconductor layer 4 is formed first, it is also possible that the first transparent electrode 9 is formed first and then the oxide semiconductor layer 4 is formed.

Figure 9:
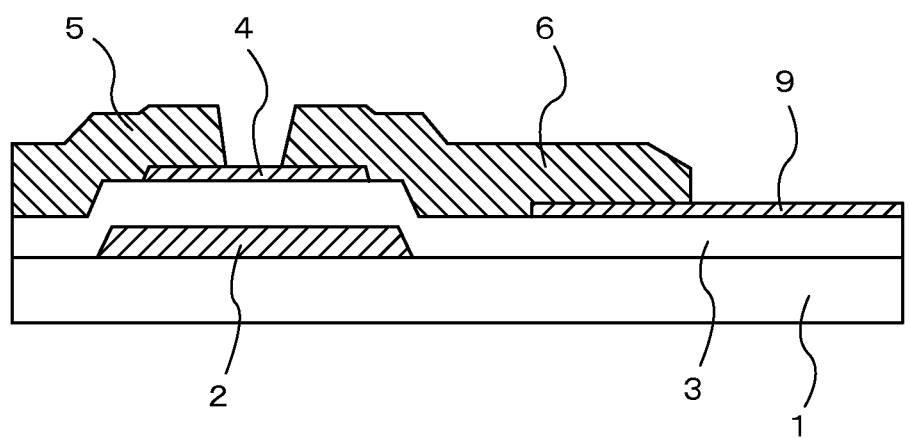
FIG. 9 is a view of the production process according to the first embodiment of the present invention, showing a cross-sectional view corresponding to the line A-A of FIG. 5.

Next, the source electrode 5 and the drain electrode 6 are formed as shown in FIG. 9.

This formation process is performed, for example, by the following steps.

Note that, although not shown, it is necessary to form the contact hole CH connecting to the gate electrode 2 before the source electrode 5 and the drain electrode 6 are formed.

A metal conductive film such as a molybdenum film, aluminum film, or titanium film is deposited by sputtering on the glass substrate 1 in which the channel protective layer and the oxide semiconductor layer 4 are formed. Next, a photosensitive polymer film is applied on the metal conductive film, which is then developed and patterned to form a resist pattern. After that, the metal conductive film exposed from the resist pattern is removed by wet etching or dry etching. Then, the resist pattern is removed to form the source electrode 5 and the drain electrode 6.

Because of this formation process, the source electrode 5 and drain electrode 6 of the oxide TFT configuring the peripheral circuit are formed also in the peripheral circuit portion SL in a similar way (see FIGS. 3A and 3B).

Figure 10:
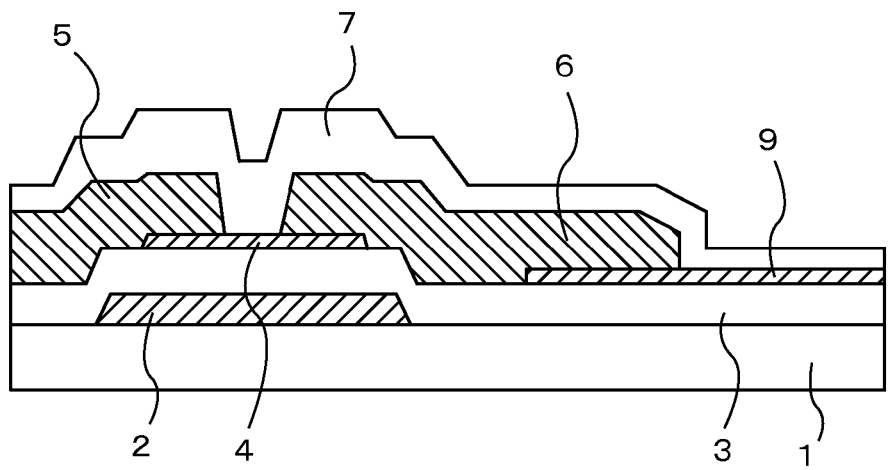
FIG. 10 is a view of the production process according to the first embodiment of the present invention, showing a cross-sectional view corresponding to the line A-A of FIG. 5.

Next, the protective layer 7 is formed as shown in FIG. 10.

This formation process is performed, for example, by the following steps.

The protective layer 7 is formed by depositing an insulating film such as a silicon oxide film, silicon nitride film, or silicon oxide nitride film by the plasma CVD method or other suitable methods.

Because of this formation process, the protective layer 7 of the oxide TFT configuring the peripheral circuit is formed also in the peripheral circuit portion SL in a similar way (see FIGS. 3A and 3B).

Note that the present invention is also applicable to an oxide TFT without having the protective layer 7. In other words, there is no particular limit on the form of the oxide TFT as long as the oxide TFT of the peripheral circuit is covered by the ultraviolet absorbing layer such as the alignment film 8.

Figure 11:
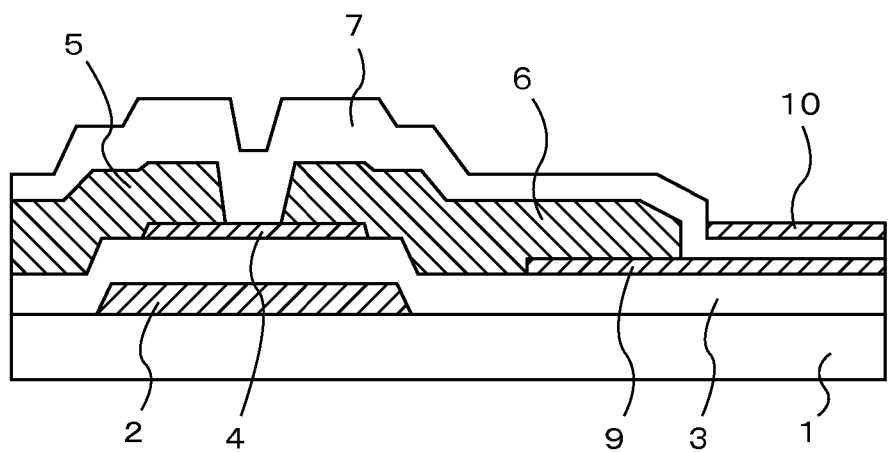
FIG. 11 is a view of the production process according to the first embodiment of the present invention, showing a cross-sectional view corresponding to the line A-A of FIG. 5.

Next, the second transparent electrode 10 is formed as shown in FIG. 11.

This formation process is performed, for example, by the following steps.

An oxide layer such as an In—Sn—O based, In—Zn—O based, or Zn—O based oxide layer is deposited by sputtering. Next, a photosensitive polymer film is applied on the oxide layer, which is then developed and patterned to form a resist pattern. After that, the oxide layer exposed from the resist pattern is removed by etching. Then, the resist pattern is removed to form the second transparent electrode 10.

Note that after the above process, the second transparent electrode 10 may be stabilized by a calcination process.

Figure 12:
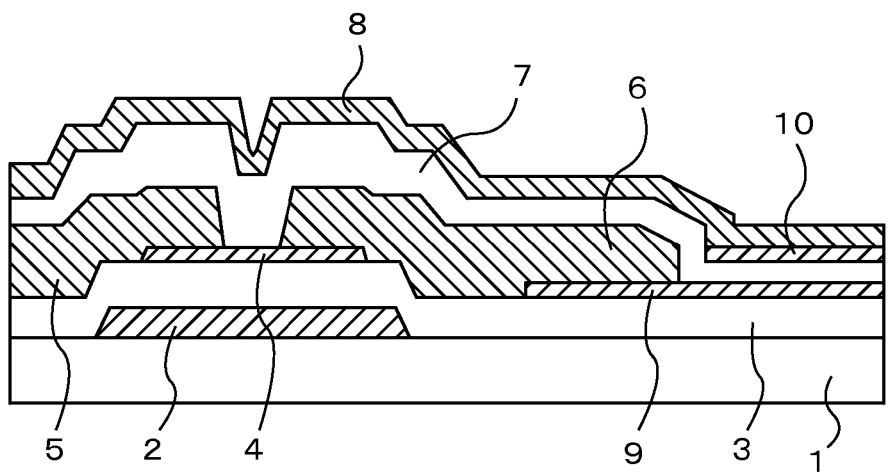
FIG. 12 is a view of the production process according to the first embodiment of the present invention, showing a cross-sectional view corresponding to the line A-A of FIG. 5.

Next, the alignment film 8 is formed as shown in FIG. 12.

This formation process is performed, for example, by the following steps.

The alignment film 8 is formed by using a material capable of being subjected to an alignment treatment by irradiation with ultraviolet light. The alignment film 8 is formed by depositing a material such as, for example, a polymer containing azobenzene, a polymer containing cinnamic acid, and a polymer containing cyclobutane, so as to cover the entire range of the pixel portion PA and the peripheral circuit portion SL. In other words, the alignment film 8 is formed so as to cover the oxide TFT configuring the peripheral circuit in the peripheral circuit portion SL.

Note that after the above process, the photo alignment treatment is performed by irradiation with ultraviolet light.

Thus, the alignment film 8 is formed in the pixel portion PA for the photo alignment treatment, and at the same time, the alignment film 8 is formed in the peripheral circuit portion SL for the protection of the oxide TFT, by the same lamination process (see FIGS. 3A and 3B).

Next, the influence of the absorption of the ultraviolet light in the oxide semiconductor layer 4 will be described.

For example, in the In—Ga—Zn—O based oxide semiconductor layer (IGZO layer) 4, the band gap of the IGZO layer is about 3.2 eV. When the photo alignment treatment is performed on the alignment film 8 by irradiating with ultraviolet light from a mercury lamp, ultraviolet light with wavelengths of 254 nm, 313 nm, 365 nm, 405 nm, 436 nm, and the like are irradiated onto the IGZO layer.

As described above, when the IGZP layer 4 is irradiated with ultraviolet light, a defect level is formed within the oxide semiconductor layer. If the defect level is of donor type, the threshold voltage can be depleted. Further, the time-dependent degradation of TFT characteristics can be accelerated by the increase in such defect levels.

Such influence can reach the oxide semiconductor layer 4 by the ultraviolet irradiation. However, because of the structure in which the alignment film 8 is formed in the pixel portion PA, the alignment film 8 effectively absorbs the ultraviolet light. Thus, it is possible to prevent the ultraviolet light from affecting the oxide semiconductor layer 4 of the oxide TFT. As a result, the threshold voltage is not changed.

On the other hand, in the conventional case shown in FIGS. 2 and 4, the oxide TFT configuring the peripheral circuit is not covered by the alignment film in the peripheral circuit portion SL. Thus, the ultraviolet light, which is irradiated onto the pixel portion PA for the photo alignment treatment, is also irradiated onto the peripheral circuit portion SL. As a result, the threshold voltage of the oxide TFT of the peripheral circuit is changed by irradiation with ultraviolet light.

On the other hand, in the present invention, the alignment film 8 is provided so as to cover the oxide TFT also in the peripheral circuit portion SL as described above. Thus, the alignment film 8 serves as an ultraviolet absorbing layer to effectively absorb the ultraviolet light in order to prevent a change in the threshold voltage of the oxide TFT.

Note that in the above example the gate scanning circuit is shown as the peripheral circuit. However, the present invention is also applicable to a selector circuit involved in the control of the drain voltage.

Accordingly, in the liquid crystal display device using the liquid crystal display panel, good gate scanning circuit operation and selector circuit operation can be achieved. As a result, an image display device with excellent contrast and reliability can be achieved.

Second Embodiment

Figure 13A:
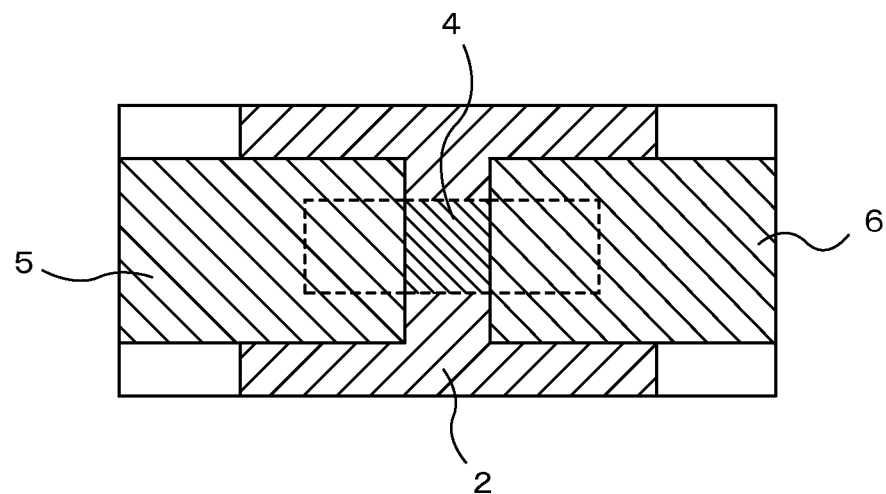
Figure 13B:
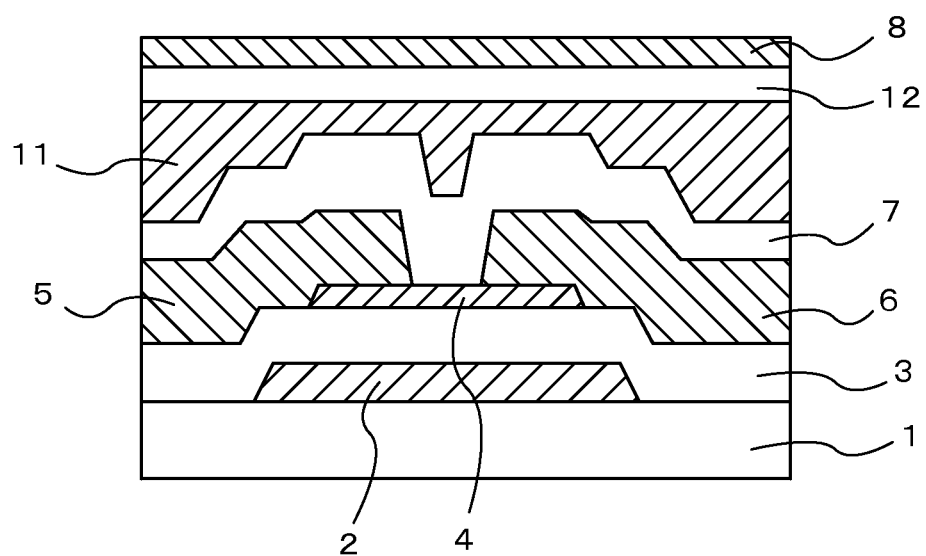
Figure 14A:
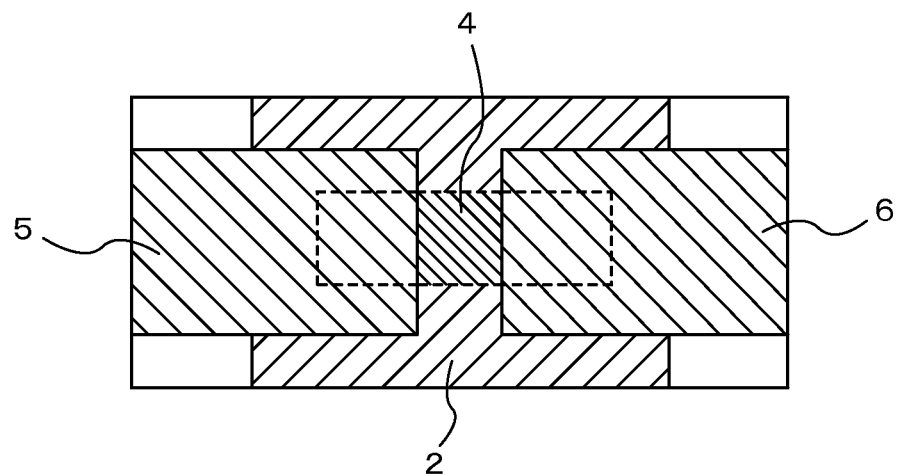
Figure 14B:
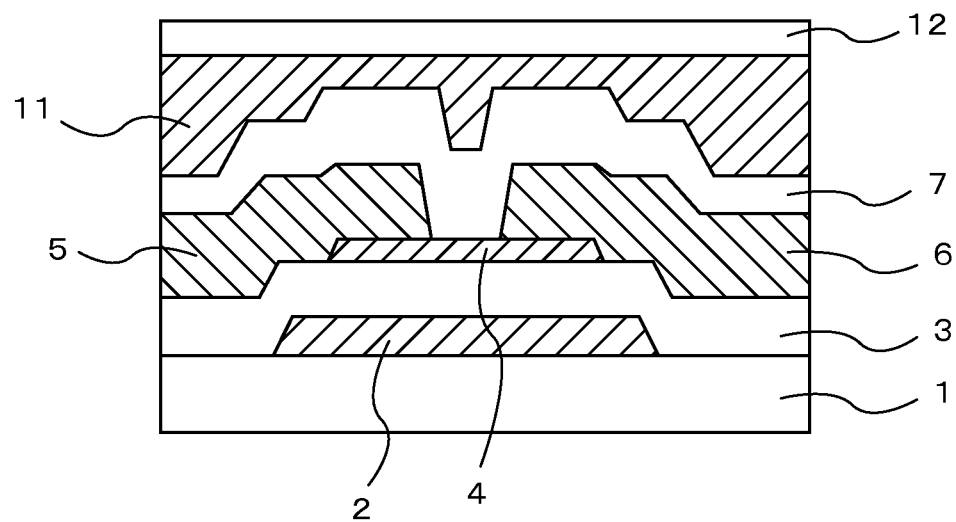

FIGS. 13A and 13B show the oxide TFT of the peripheral circuit portion SL according to a second embodiment of the present invention. FIGS. 14A and 14B show the oxide TFT of the peripheral circuit portion SL according to the conventional example. Note that FIG. 13A and FIG. 14A are plan views of the oxide TFT, and FIG. 13B and FIG. 14B are cross-sectional views of the oxide TFT, respectively.

The basic configuration of the present embodiment is the same as that of the first embodiment. The main difference from the first embodiment is that the alignment film 8, which will serve as an ultraviolet absorbing layer of the peripheral circuit portion SL, is provided through the protective layer 7, the organic flattening layer 11, and the inter-layer capacitive film 12.

In the present embodiment (FIGS. 13A and 13B) and the conventional example (FIGS. 14A and 14B), the main difference is whether the oxide TFT configuring the peripheral circuit portion SL is covered by the alignment film 8. Most of the other configurations are the same in FIGS. 3 and 4.

Further, the main difference between the present embodiment (FIGS. 13A and 13B) and the first embodiment is whether the organic flattening layer 11 and the inter-layer capacitive film 12 are provided. The rest of the configurations is mostly the same.

The gate electrode 2 is formed on the glass substrate 1. Further, the gate insulating film 3 is formed so as to cover the gate electrode 2. Then, the oxide semiconductor layer 4 is formed on the gate insulating film 3.

The source electrode 5 and the drain electrode 6 are respectively formed so as to cover the oxide semiconductor layer 4, and at the same time, come into contact with the oxide semiconductor layer 4. Then, the protective layer 7 is formed so as to cover the source electrode 5 and the drain electrode 6. Further, the organic flattening layer 11 is formed so as to cover the protective layer 7.

Then, the inter-layer capacitive film 12 is formed on the organic flattening layer 11. Then, the alignment film 8 is formed so as to cover the inter-layer capacitive film 12.

Note that in FIG. 13A and FIG. 14A, the gate insulating film 3, the protective layer 7, the organic flattening layer 11, the inter-layer capacitive film 12, and the alignment film 8 are formed over the entire surface, but are omitted to clearly show the structure.

In the present embodiment, the gate electrode 2, the gate insulating film 3, the oxide semiconductor layer 4, the source electrode 5, the drain electrode 6, the protective layer 7, and the alignment film 8 used here are the same as those described in the first embodiment.

The organic flattening layer 11 is formed by an acrylic polymer material or other suitable materials. The film thickness of the organic flattering film 11 can be set to an optimum value, for example, in the range of 500 to 5000 nm, by taking into account the capacity, transmission, and the like.

The inter-layer capacitive film 12 is formed by an insulating film such as a silicon nitride film or silicon oxide nitride film. The film thickness of the inter-layer capacitive film 12 can be set to an optimum value, for example, in the range of 100 to 1000 nm, by taking into account the withstand voltage and capacity.

Next, the formation process of the oxide TFT according to the present embodiment will be described with reference to FIG. 5 and FIGS. 15 to 25.

FIG. 5 shows the structure of a sub pixel in the pixel portion PA of the TFT substrate as described above. FIGS. 15 to 25 show the production process of the A-A cross-sectional structure.

Here, the present invention relates to the structure of the peripheral circuit portion SL, in which the oxide TFT of the peripheral circuit portion SL is formed by the same process as the oxide TFT of the pixel portion PA. Thus, it is described using the production process of the pixel portion PA for a better understanding of the whole process. Further, the description of the structure of the peripheral circuit portion SL is added as well.

The production process of the oxide TFT according to the present embodiment includes the formation process of the gate electrode 2, the formation process of the gate insulating film 3, the formation process of the oxide semiconductor layer 4, the formation process of the source electrode 5 and the drain electrode 6, the formation process of the protective layer 7, the formation process of the organic flattening layer 11, the formation process of the third transparent electrode 13, the formation process of the inter-layer capacitive film 12, the formation process of the fourth transparent electrode 14, and the formation process of the alignment film 8.

Note that the oxide TFT shown in FIGS. 15 to 25 has a structure in which the source electrode and the pixel electrode are connected. However, it is also possible to have a structure in which the common electrode is connected to the pixel electrode.

Figure 15:
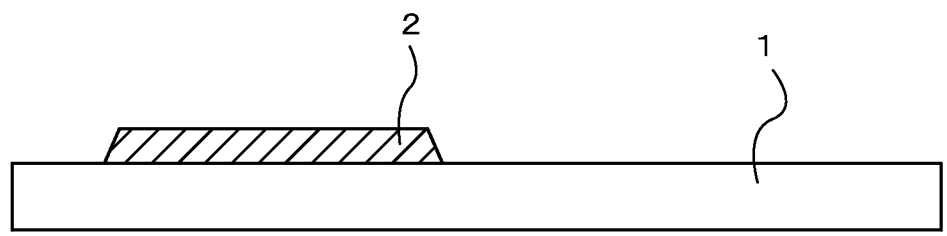
FIG. 15 is a view of a production process according to the second embodiment of the present invention, showing a cross-sectional view corresponding to the line A-A of FIG. 5.

As shown in FIG. 15, the gate electrode 2 is formed on the glass substrate 1.

This formation process is performed, for example, by the following steps.

For example, the gate electrode 2 is formed by depositing a metal conductive film such as a molybdenum film, tungsten film, or aluminum film on the glass substrate 1 by sputtering. Next, a photosensitive polymer film is applied on the metal conductive film, which is then developed and patterned to form a resist pattern. After that, the metal conductive film exposed from the resist pattern is removed by wet etching or dry etching. Then, the resist pattern is removed to form the gate electrode 2.

Because of this formation process, the gate electrode 2 of the oxide TFT configuring the peripheral circuit is formed on the glass substrate 1 also in the peripheral circuit portion SL in a similar way (see FIGS. 13A and 13B).

Note that although the gate electrode 2 is formed on the glass substrate 1, a silicon nitride film can be formed on the glass substrate and then the gate electrode can be formed on the silicon nitride film, in order to prevent alkali ions or other substances from entering from the glass substrate. Further, instead of the glass substrate, it is also possible to use a flexible substrate that can endure the thermal process of the TFT.

Figure 16:
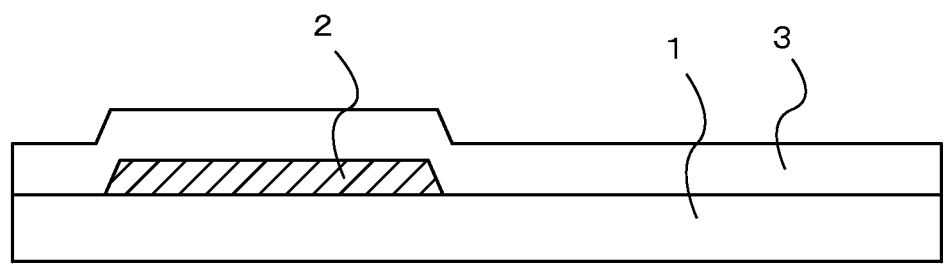
FIG. 16 is a view of the production process according to the second embodiment of the present invention, showing a cross-sectional view corresponding to the line A-A of FIG. 5.

Next, the gate insulating film 3 covering the gate electrode 2 is formed as shown in FIG. 16.

This formation process is performed, for example, by the following steps.

The gate insulating film 3 is formed by depositing an insulating film such as a silicon oxide film, silicon nitride film, or silicon oxide nitride film by the plasma chemical vapor deposition (CVD) method on the glass substrate 1 in which the gate electrode 2 is formed.

Because of this formation process, the gate insulating film 3 of the oxide TFT configuring the peripheral circuit is formed also in the peripheral circuit portion SL in a similar way (see FIGS. 13A and 13B).

Figure 17:
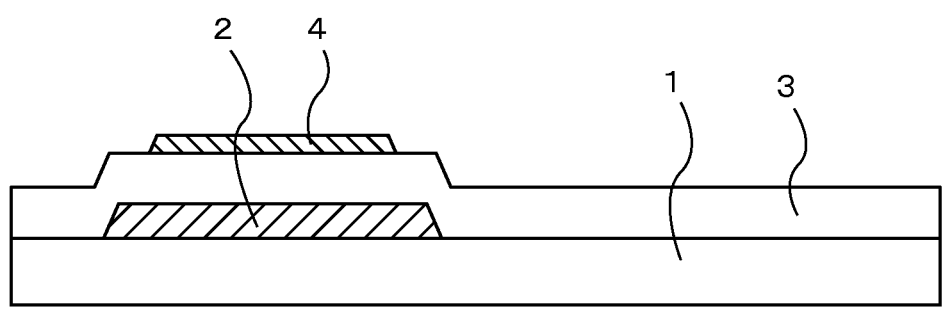
FIG. 17 is a view of the production process according to the second embodiment of the present invention, showing a cross-sectional view corresponding to the line A-A of FIG. 5.

Next, as shown in FIG. 17, the oxide semiconductor layer 4 is formed on the gate insulating film 3.

This formation process is performed, for example, by the following steps.

An oxide semiconductor, such as an In—Ga—Zn—O based, In—Al—Zn—O based, In—Sn—Zn—O based, In—Zn—O based, In—Sn—O based, Zn—O based, or Sn—O based oxide film, is deposited by sputtering on the glass substrate 1 in which the gate insulating film 3 is formed. Next, a photosensitive polymer film is applied on the oxide semiconductor, which is then developed and patterned to form a resist pattern. After that, the oxide semiconductor exposed from the resist pattern is removed by wet etching. Then, the resist pattern is removed to form the oxide semiconductor layer 4.

Because of this formation process, the oxide semiconductor layer 4 of the oxide TFT configuring the peripheral circuit is formed also in the peripheral circuit portion SL in a similar way (see FIGS. 13A and 13B).

Figure 18:
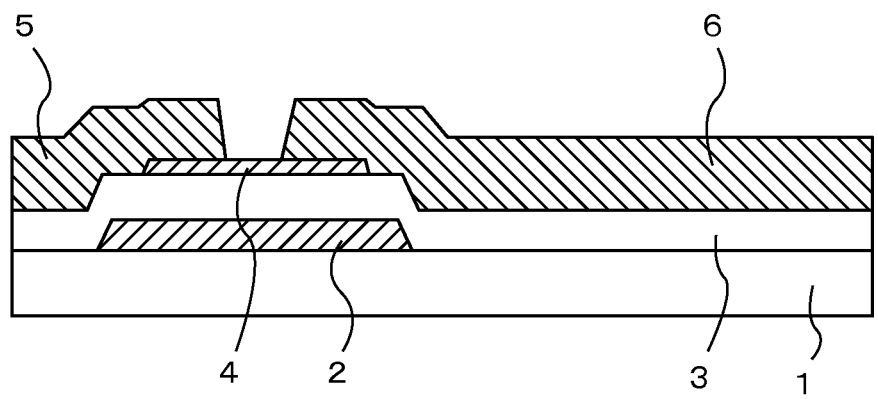
FIG. 18 is a view of the production process according to the second embodiment of the present invention, showing a cross-sectional view corresponding to the line A-A of FIG. 5.

Next, as shown in FIG. 18, the source electrode 5 and the drain electrode 6 are formed.

This formation process is performed, for example, by the following steps.

Note that, although not shown, it is necessary to form the contact hole CH connecting to the gate electrode 2 before the source electrode 5 and the drain electrode 6 are formed.

A metal conductive film such as a molybdenum film, aluminum film, or titanium film is deposited by sputtering on the glass substrate 1 in which the channel protective layer and the oxide semiconductor layer 4 are formed. Next, a photosensitive polymer film is applied on the metal conductive film, which is then developed and patterned to form a resist pattern. After that, the metal conductive film exposed from the resist pattern is removed by wet etching or dry etching. Then, the resist pattern is removed to form the source electrode 5 and the drain electrode 6.

Because of this formation process, the source electrode 5 and drain electrode 6 of the oxide TFT configuring the peripheral circuit are formed also in the peripheral circuit portion SL in a similar way (see FIGS. 13A and 13B).

Figure 19:
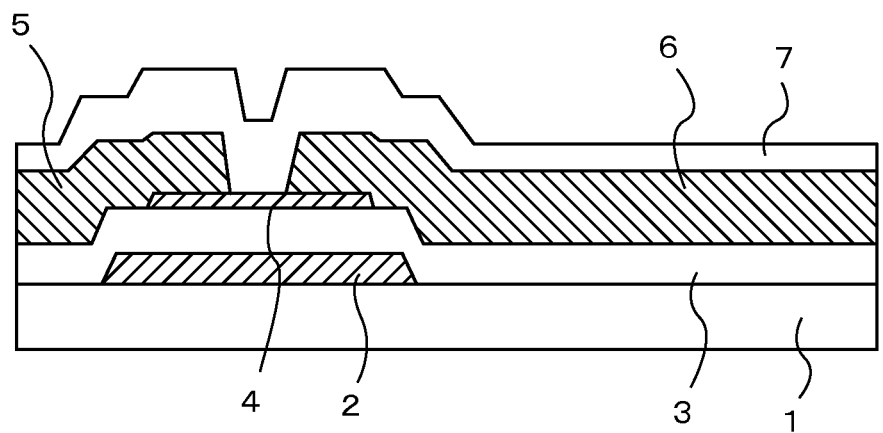
FIG. 19 is a view of the production process according to the second embodiment of the present invention, showing a cross-sectional view corresponding to the line A-A of FIG. 5.

Next the protective layer 7 is formed as shown in FIG. 19.

This formation process is performed, for example, by the following steps.

The protective layer 7 is formed by depositing an insulating film such as a silicon oxide film, silicon nitride film, or silicon oxide nitride film by the plasma CVD method or other suitable methods.

Because of this formation process, the protective layer 7 of the oxide TFT configuring the peripheral circuit is formed also in the peripheral circuit portion SL in a similar way (see FIGS. 13A and 13B).

Figure 20:
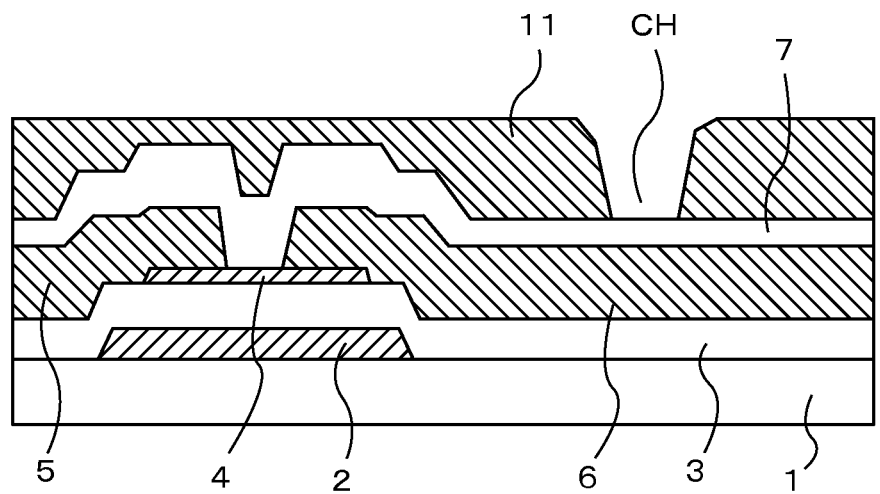
FIG. 20 is a view of the production process according to the second embodiment of the present invention, showing a cross-sectional view corresponding to the line A-A of FIG. 5.

Next, the organic flattening layer 11 is formed as shown in FIG. 20.

This formation process is performed, for example, by the following steps.

The organic flattening layer 11 is formed by applying and firing an acrylic polymer material and the like. Then, the polymer material is developed and exposed to form a pattern for the contact hole CH.

Because of this formation process, the organic flattening layer 11 of the oxide TFT configuring the peripheral circuit is formed also in the peripheral circuit portion SL in a similar way (see FIGS. 13A and 13B).

Figure 21:
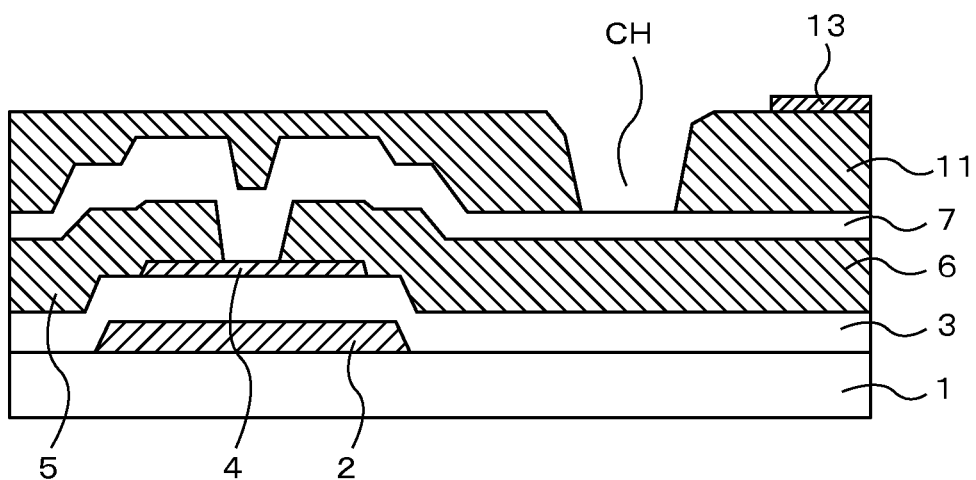
FIG. 21 is a view of the production process according to the second embodiment of the present invention, showing a cross-sectional view corresponding to the line A-A of FIG. 5.

Next, the third transparent electrode 13 is formed as shown in FIG. 21.

This formation process is performed, for example, by the following steps.

The third transparent electrode 13 is formed by depositing an oxide layer such as an In—Sn—O based, In—Zn—O based, or Zn—O based oxide layer by sputtering. Next, a photosensitive polymer film is applied on the oxide layer, which is then developed and patterned to form a resist pattern. After that, the third transparent electrode 13 is stabilized by the calcination process.

Figure 22:
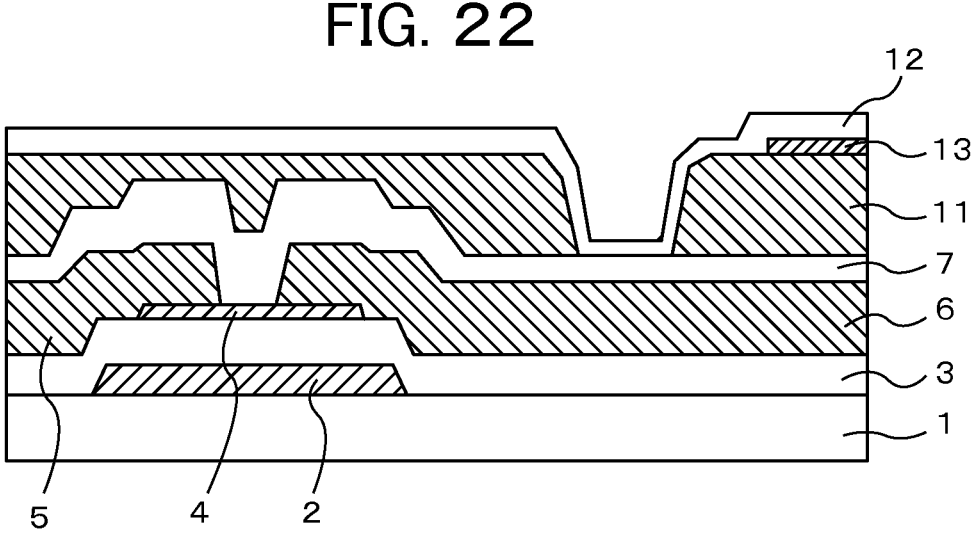
FIG. 22 is a view of the production process according to the second embodiment of the present invention, showing a cross-sectional view corresponding to the line A-A of FIG. 5.

Next, the inter-layer capacitive film 12 is formed as shown in FIG. 22.

This formation process is performed, for example, by the following steps.

Figure 23:
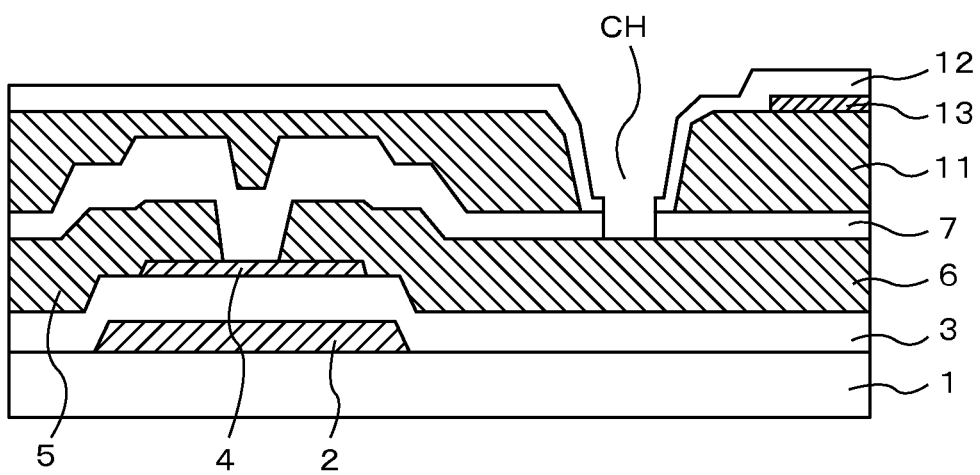
FIG. 23 is a view of the production process according to the second embodiment of the present invention, showing a cross-sectional view corresponding to the line A-A of FIG. 5.

The inter-layer capacitive film 12 is formed by depositing an insulating film such as a silicon nitride film or silicon oxide nitride film by the plasma CVD method or other suitable methods. Then, a photosensitive polymer film is applied on the inter-layer capacitive film 12, which is then developed and patterned to form a resist pattern. After that, the inter-layer capacitive film 12 and the protective layer 7 that are exposed from the resist pattern are removed by dry etching. Then, the resist pattern is removed and the contact hole CH is formed as shown in FIG. 23.

Because of this formation process, the inter-layer capacitive film 12 of the oxide TFT configuring the peripheral circuit is formed also in the peripheral circuit portion SL in a similar way (see FIGS. 13A and 13B).

Figure 24:
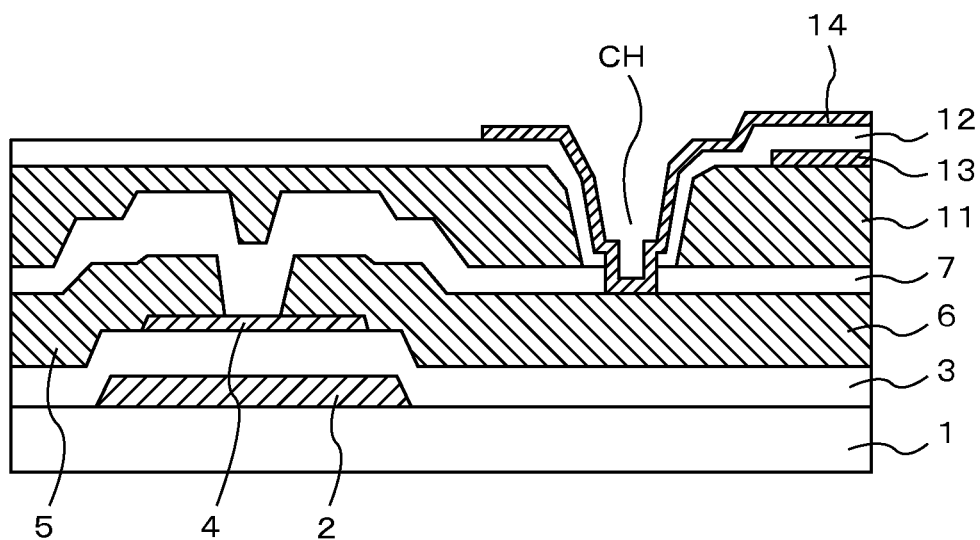
FIG. 24 is a view of the production process according to the second embodiment of the present invention, showing a cross-sectional view corresponding to the line A-A of FIG. 5.

Next, the fourth transparent electrode 14 is formed as shown in FIG. 24.

This formation process is performed, for example, by the following steps.

The fourth transparent electrode 14 is formed by depositing an oxide layer such as an In—Sn—O based, In—Zn—O based, or Zn—O based oxide layer by sputtering so as to come into contact with the source electrode formed by the metal film. Next, a photosensitive polymer film is applied on the oxide layer, which is then developed and patterned to form a resist pattern. After that, the fourth transparent electrode 14 is stabilized by the calcination process.

Figure 25:
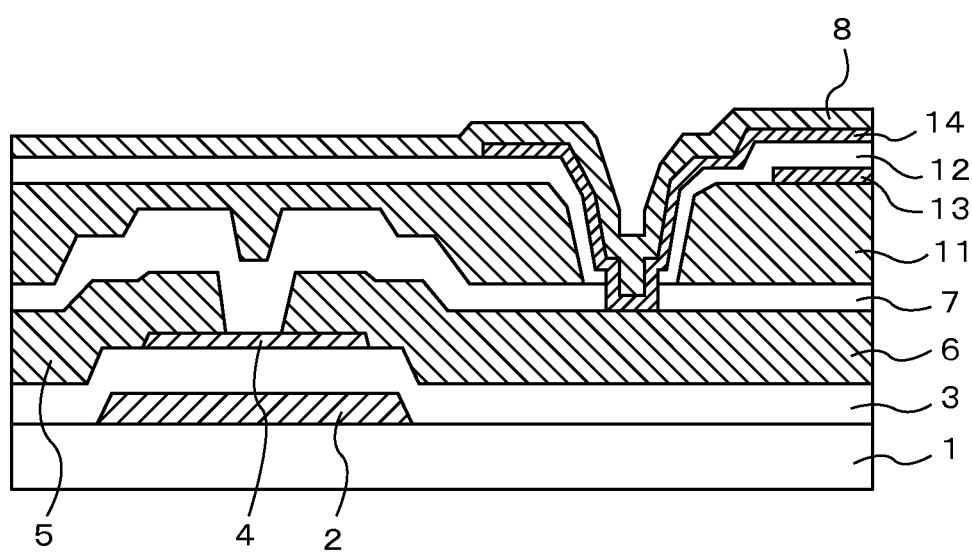
FIG. 25 is a view of the production process according to the second embodiment of the present invention, showing a cross-sectional view corresponding to the line A-A of FIG. 5.

Next, the alignment film 8 is formed as shown in FIG. 25.

This formation process is performed, for example, by the following steps.

The alignment film 8 is formed by using a material capable of being subjected to an alignment treatment by irradiation with ultraviolet light. The alignment film 8 is formed by a material such as, for example, a polymer containing azobenzene, a polymer containing cinnamic acid, and a polymer containing cyclobutane, so as to cover the entire range of the pixel portion PA and the peripheral circuit portion SL. In other words, as shown in FIGS. 1A and 1B, the alignment film 8 is formed over the oxide TFT configuring the peripheral circuit in the peripheral circuit portion SL.

Note that after the above process, the alignment film 8 is subjected to photo alignment treatment by irradiation with ultraviolet light.

Thus, the alignment film 8 is formed in the pixel portion PA for the photo alignment treatment, and at the same time, the alignment film 8 is formed in the peripheral circuit portion SL for the protection of the oxide TFT, by the same lamination process (see FIGS. 13A and 13B).

Next, the influence of the absorption of the ultraviolet light in the oxide semiconductor layer 4 will be described.

In the present embodiment, similarly to the first embodiment, the alignment film 8 is provided so as to cover the oxide TFT also in the peripheral circuit portion SL. Thus, the alignment film 8 serves as an ultraviolet absorbing layer to effectively absorb the ultraviolet light in order to prevent a change in the threshold voltage of the oxide TFT.

Accordingly, in the liquid crystal display device using the liquid crystal display panel, good gate scanning circuit operation and selector circuit operation can be achieved. As a result, an image display device with excellent contrast and reliability can be achieved.

Note that, in the embodiment described above, the gate scanning circuit is shown as the peripheral circuit. However, the present invention is also applicable to a selector circuit involved in the control of the drain voltage.

Further, in the embodiment described above, the alignment film 8 is provided through the organic flattening layer 11 and the inter-layer capacitive film 12. However, it is also possible to provide the alignment film 8 through the organic flattening layer 11 by eliminating the inter-layer capacitive film 12 (and also eliminating the protective layer 7), according to the structure of the TFT.

Third Embodiment

Figure 26:
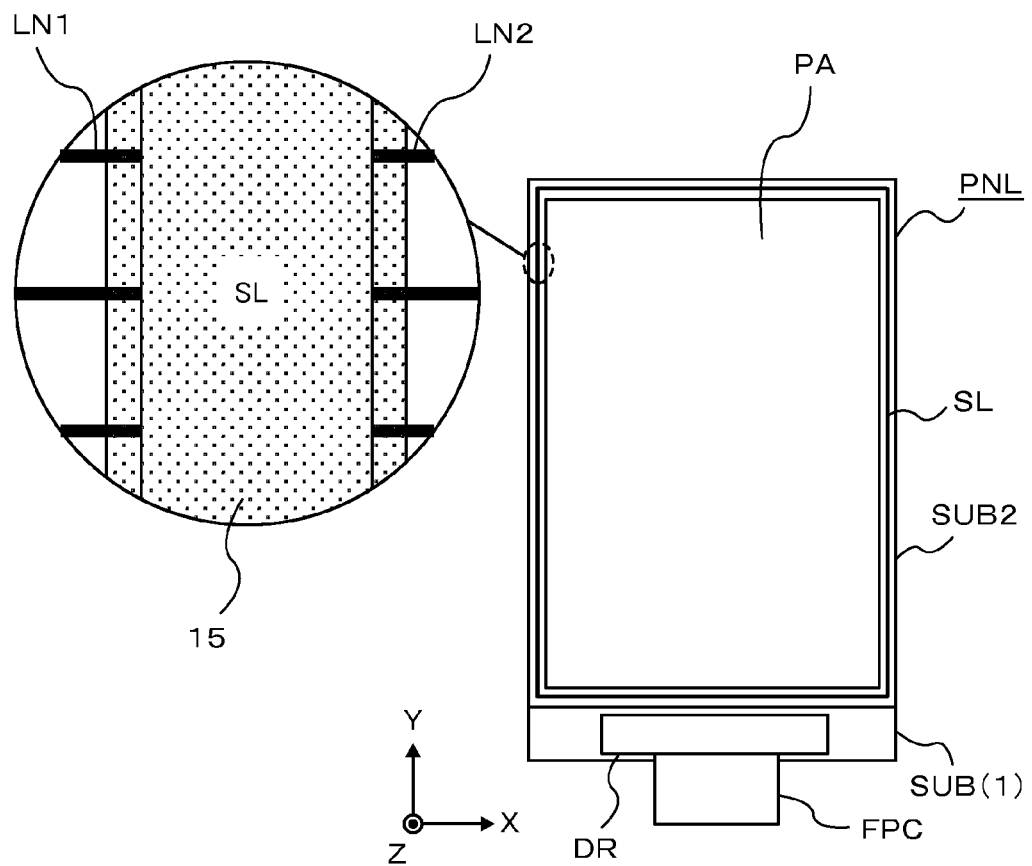

FIG. 26A is a plan view of a liquid crystal display panel according to a third embodiment of the present invention. FIG. 26B shows an enlarged view of a peripheral circuit portion of the liquid crystal display panel.

In the present embodiment, a transparent electrode 15 is used for the ultraviolet absorbing layer. A shown in FIG. 26B, the fifth transparent electrode 15 is formed so as to completely cover the gate scanning circuit, which is the peripheral circuit.

In the conventional structure, no transparent electrode is formed so as to cover the gate scanning circuit in the peripheral portion in which the gate scanning circuit is mounted. In other words, the transparent electrode originally aims to use it to control the liquid crystal layer by the electric field, so that it is enough to provide the transparent electrode only in the pixel portion PA. For this reason, the transparent electrode is not formed so as to completely cover the peripheral circuit SL.

On the other hand, in the present embodiment, the transparent electrode 15 is provided independently of the pixel electrode and the common electrode. The transparent electrode 15, which serves as an earth or floating electrode, is not connected to the power source and thus does not perform voltage application.

Figure 27:
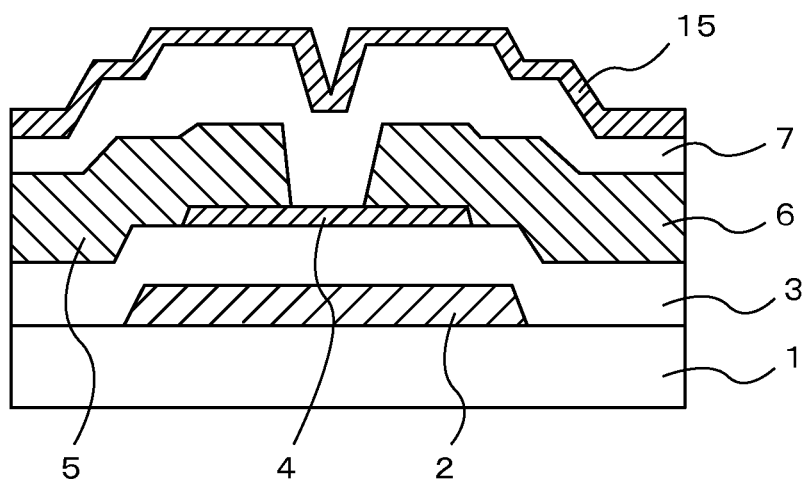
FIG. 27 is a view of an oxide TFT of the peripheral circuit according to a third embodiment of the present invention, which is a cross-sectional view of the oxide TFT.

FIG. 27 is a cross-sectional view of the oxide TFT of the gate scanning circuit according to the third embodiment.

The basic configuration of the present embodiment is the same as that of the first embodiment. The main difference from the first embodiment is that the fifth transparent electrode 15 is provided instead of the alignment film 8.

The gate electrode 2 is formed on the glass substrate 1, and the gate insulating film 3 is formed so as to cover the gate electrode 2. Then, the oxide semiconductor layer 4 is formed on the gate insulating film 3. Further, the source electrode 5 and the drain electrode 6 are respectively formed so as to cover the oxide semiconductor layer 4, and at the same time, come into contact with the oxide semiconductor layer 4. Further, the protective layer 7 is formed so as to cover the source electrode 5 and the drain electrode 6. Then, the fifth transparent electrode 15 is formed on the protective layer 7.

The order of the production process of the oxide TFT according to the present embodiment is the same as the order of the process shown in the first embodiment (see FIGS. 6 to 12). However, it is desirable that in the process of forming the second transparent electrode 10 in the pixel portion PA (see FIG. 11), the fifth transparent electrode 15 covering the gate scanning circuit in the peripheral circuit portion SL is formed at the same time as the formation of the second transparent electrode 10. In other words, it is desirable that the second transparent electrode 10 and the fifth transparent electrode 15 are formed on the same layer. In this way, the sputtering process and photo etching process for forming the transparent electrodes 10 and 15 are shared. Thus, the number of production processes can be reduced.

In the present embodiment, the fifth transparent electrode 15 is formed by an oxide layer such as an In—Sn—O based, In—Zn—O based, or Zn—O based oxide layer. For example, the band gap of the ITO, which is a transparent electrode material, is about 3.5 to 4.0 eV. The transparent electrode 15 of ITO can absorb ultraviolet light. Thus, it is possible to prevent the threshold voltage from shifting by absorbing the ultraviolet light to be irradiated onto the oxide semiconductor layer 4 of IGZO, and the like, in the photo alignment treatment. Note that the band gap of the IZO based transparent electrode 15 is about 3.5 eV or less, so that the fifth transparent electrode 15 can also absorb ultraviolet light.

As described above, the oxide based transparent electrode 15 is formed so as to cover the peripheral circuit portion SL to absorb the ultraviolet light to be irradiated for the photo alignment treatment of the pixel portion PA, in order to prevent the shift of the threshold voltage of the oxide TFT configuring the peripheral circuit.

Note that the oxide based transparent electrode 15 is used in the present embodiment. However, in the present invention, the same effects as those described above can be obtained by using any material that can be used as a transparent electrode and can absorb ultraviolet light, for the transparent electrode 15 covering the peripheral circuit portion SL.

Fourth Embodiment

Figure 28:
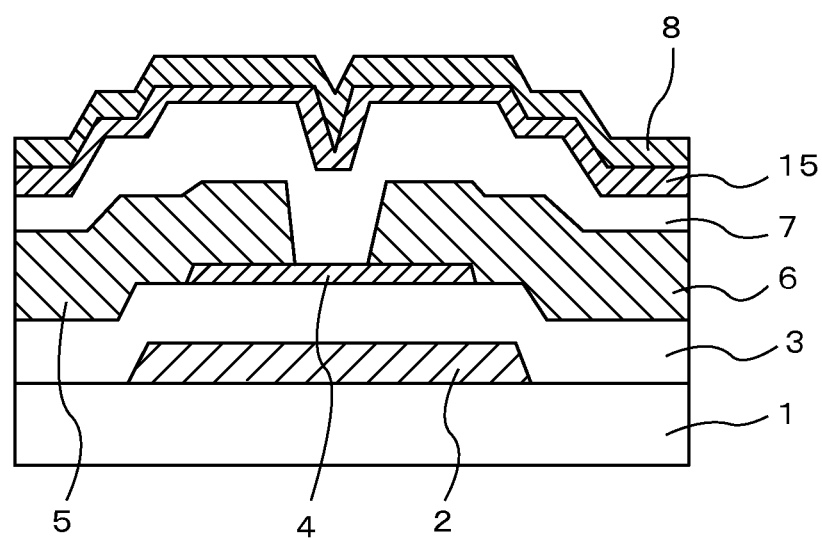
FIG. 28 is a view of an oxide TFT of the peripheral circuit according to a fourth embodiment of the present invention, which is a cross-sectional view of the oxide TFT.

FIG. 28 is a cross-sectional view of the oxide TFT of the peripheral circuit (gate scanning circuit) according to a fourth embodiment.

The basic configuration of the present embodiment is the same as that of the third embodiment. The main difference from the third embodiment is that the fifth electrode layer 15 and the alignment film 8 are provided as the ultraviolet absorbing layer of the peripheral circuit portion SL.

In other words, in the present embodiment, the fifth transparent electrode 15 is formed so as to cover the peripheral circuit portion SL, and then the alignment film 8 is formed on the transparent electrode 15.

As described above, the laminated layer of the fifth transparent electrode 15 and the alignment film 8 is formed so as to cover the peripheral circuit portion SL, to effectively absorb the ultraviolet light to be irradiated onto the oxide semiconductor layer 4 of IGZO and the like, in order to prevent the threshold voltage from shifting.

Fifth Embodiment

Figure 29:
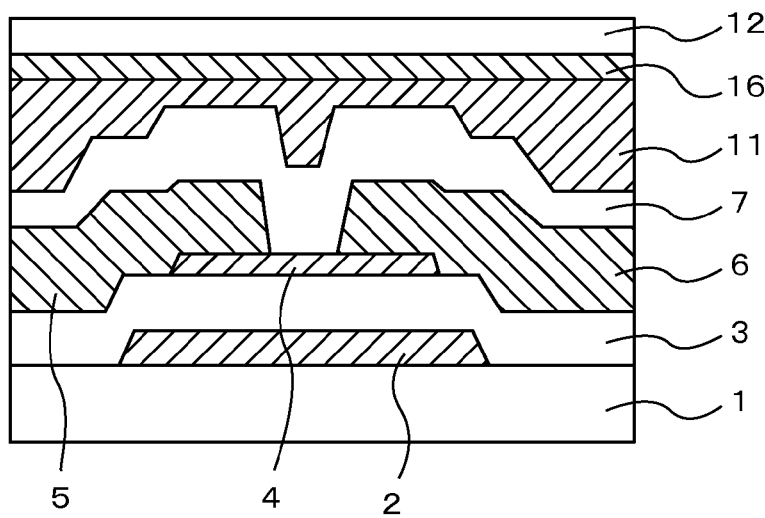
FIG. 29 is a view of an oxide TFT of the peripheral circuit according to a fifth embodiment of the present invention, which is a cross-sectional view of the oxide TFT.

FIG. 29 is a cross-sectional view of the oxide TFT of the peripheral circuit according to a fifth embodiment.

The basic configuration of the present embodiment is the same as that of the second embodiment. The main difference from the second embodiment is that a sixth electrode layer 16 is provided as the ultraviolet absorbing layer of the peripheral circuit portion SL, in which the inter-layer capacitive film 12 is also provided.

In other words, in the present embodiment, the gate electrode 2 is formed on the glass substrate 1, and the gate insulating film 3 is formed so as to cover the gate electrode 2. Then, the oxide semiconductor layer 4 is formed on the gate insulating film 3. The source electrode 5 and the drain electrode 6 are respectively formed so as to cover the oxide semiconductor layer 4, and at the same time, come into contact with the oxide semiconductor layer 4. Then, the protective layer 7 is formed so as to cover the source electrode 5 and the drain electrode 6. Further, the organic flattening layer 11 is formed so as to cover the protective layer 7. The sixth transparent electrode 16 is formed on the organic flattening layer 11. Then, the inter-layer capacitive film 12 is formed so as to cover the sixth transparent electrode 16.

The sixth transparent electrode 16 is formed by the same material as the fifth transparent electrode 15. The sixth transparent electrode 16 can effectively absorb the ultraviolet light to be irradiated onto the oxide semiconductor layer 4, to prevent the threshold voltage of the oxide TFT from shifting.

Note that the order of the production process according to the present embodiment is the same as the order of the process shown in the second embodiment. However, it is desirable that in the process of forming the third transparent electrode 13 (see FIG. 21), the sixth transparent electrode 16 is formed so as to cover the peripheral circuit portion SL at the same time as the formation of the third transparent electrode 13. In other words, it is desirable that the third transparent electrode 13 and the sixth transparent electrode 16 are formed on the same layer. In this way, the sputtering process and the photo etching process for forming the transparent electrodes 13 and 16 can be shared.

Sixth Embodiment

Figure 30:
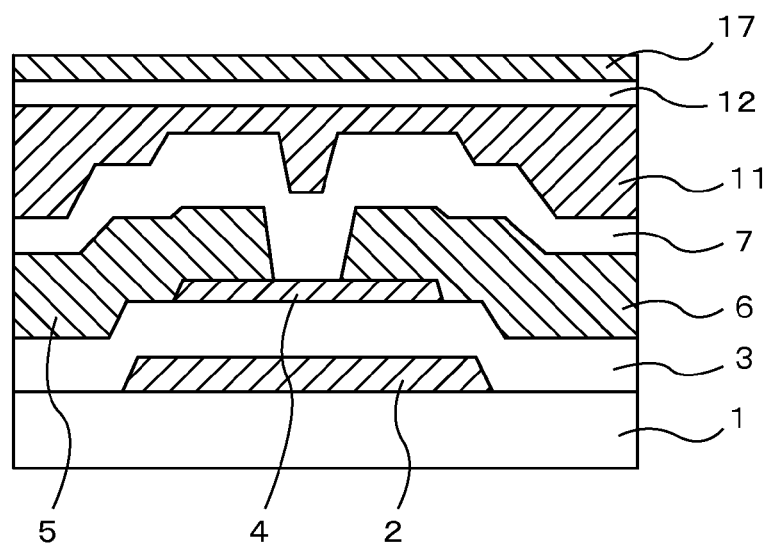
FIG. 30 is a view of an oxide TFT of the peripheral circuit according to a sixth embodiment of the present invention, which is a cross-sectional view of the oxide TFT.

FIG. 30 is a cross-sectional view of the oxide TFT of the peripheral circuit according to a sixth embodiment.

The basic configuration of the present embodiment is the same as that of the fifth embodiment. The main difference from the fifth embodiment is that the sixth transparent electrode 16 is eliminated and that the inter-layer capacitive film 12 and a seventh transparent electrode 17 are provided.

In other words, in the present embodiment, the inter-layer capacitive film 12 is formed on the organic flattening layer 11. Then, the seventh transparent electrode 17 is formed on the inter-layer capacitive film 12.

The seventh transparent electrode 17 is formed by the same material as the fifth transparent electrode 15. The seventh transparent electrode 17 can effectively absorb the ultraviolet light to be irradiated onto the oxide semiconductor layer 4, to prevent the threshold voltage of the oxide TFT from shifting.

Note that the order of the production process according to the present embodiment is the same as the order of the process shown in the second embodiment. However, it is desirable that in the process of forming the fourth transparent electrode 14 (see FIG. 24), the seventh transparent electrode 17 is formed so as to cover the peripheral circuit portion SL at the same time as the formation of the fourth transparent electrode 14. In other words, it is desirable that the fourth transparent electrode 14 and the seventh transparent electrode 17 are formed on the same layer. In this way, the sputtering process and the photo etching process for forming the transparent electrodes 14 and 17 can be shared.

Seventh Embodiment

Figure 31:
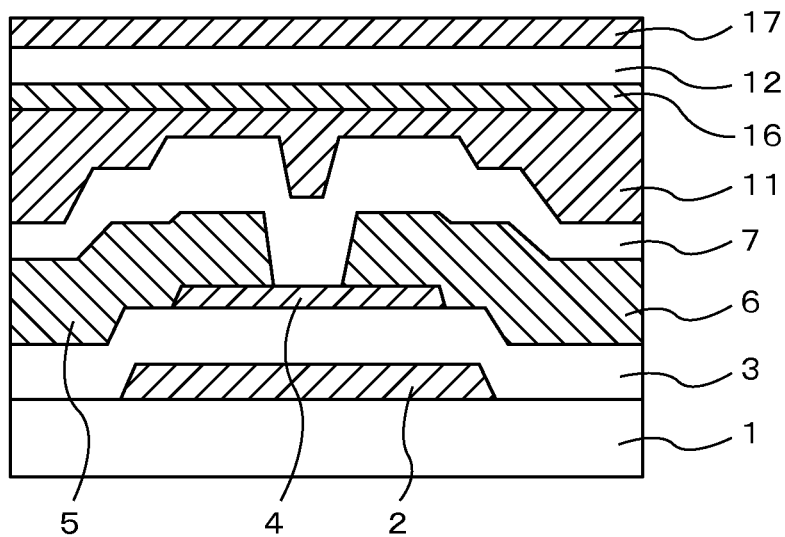
FIG. 31 is a view of an oxide TFT of the peripheral circuit according to a seventh embodiment of the present invention, which is a cross-sectional view of the oxide TFT.

FIG. 31 is a cross-sectional view of the oxide TFT of the peripheral circuit according to a seventh embodiment.

The basic configuration of the present embodiment is the same as those of the fifth and sixth embodiments. The main difference from these embodiments is that the sixth transparent electrode 16, the inter-layer capacitive film 12, and the seventh transparent electrode 17 are provided in the present embodiment.

In other words, in the present embodiment, the sixth transparent electrode 16 is formed on the organic flattening layer 11. Then, the inter-layer capacitive film 12 is formed on the sixth transparent electrode 16. Further, the seventh transparent electrode 17 is formed on the inter-layer capacitive film 12.

In the present embodiment, the sixth transparent electrode 16 and seventh transparent electrode 17 can more effectively absorb the ultraviolet light to be irradiated onto the oxide semiconductor layer 4, to prevent the threshold voltage of the oxide TFT from shifting.

Note that the order of the production process according to the present embodiment is the same as the order of the process shown in the second embodiment. However, the sixth transparent electrode 16 is preferably formed at the same time in the process of forming the third transparent electrode 13 (see FIG. 21), and the seventh transparent electrode 17 is preferably formed at the same time in the process of forming the fourth transparent electrode 14 (see FIG. 24). In this way, the sputtering process and the photo etching process for forming the transparent electrodes 13, 16 and 14, 17 can be shared.

Eighth to Tenth Embodiments

Figure 32:
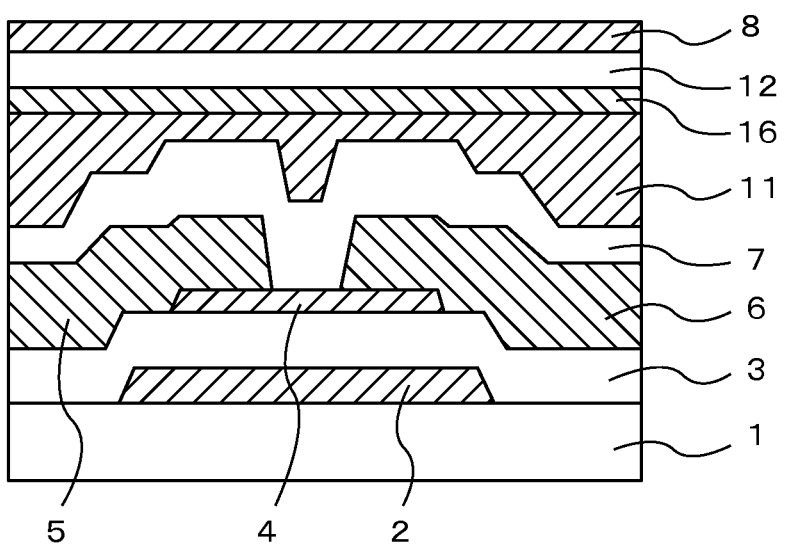
FIG. 32 is a view of an oxide TFT of the peripheral circuit according to an eighth embodiment of the present invention, which is a cross-sectional view of the oxide TFT.
Figure 33:
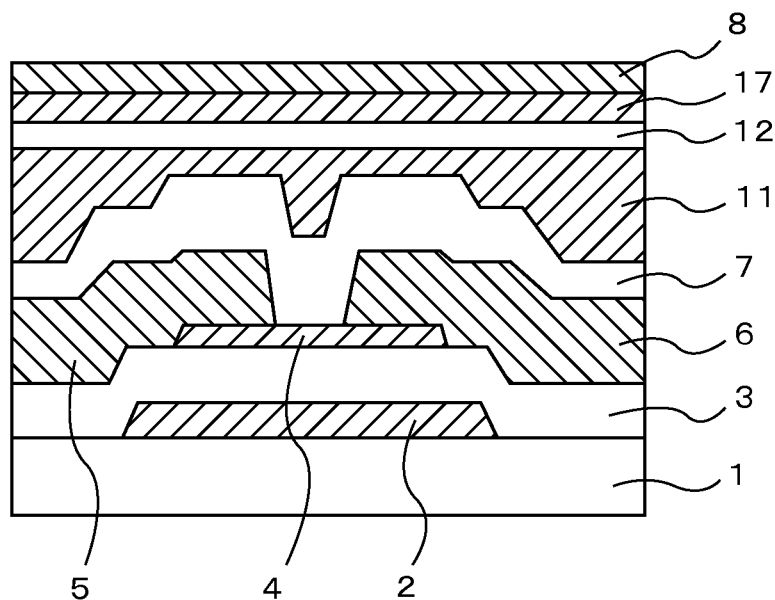
FIG. 33 is a view of an oxide TFT of the peripheral circuit according to a ninth embodiment of the present invention, which is a cross-sectional view of the oxide TFT.
Figure 34:
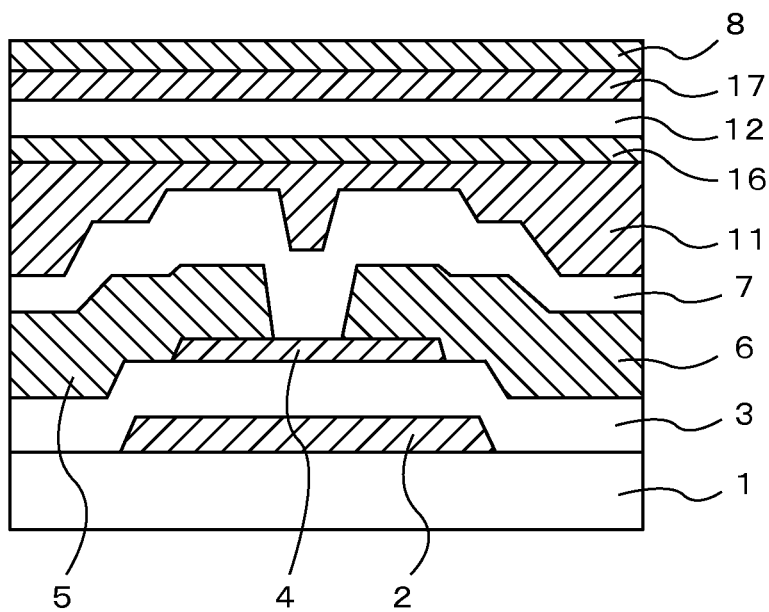
FIG. 34 is a view of an oxide TFT of the peripheral circuit according to a tenth embodiment of the present invention, which is a cross-sectional view of the oxide TFT.

FIGS. 32 to 34 are cross-sectional views of the oxide TFT of the peripheral circuit according to each of the eight to tenth embodiments.

The eight to tenth embodiments correspond respectively to the fifth to seventh embodiments, in which the alignment film 8 is also formed, respectively.

In other words, the alignment film 8 is formed on inter-layer capacitive film 12 in the eighth embodiment shown in FIG. 32, the alignment film 8 is formed on the seventh transparent electrode 17 in the ninth embodiment shown in FIG. 33, and the alignment film 8 is formed on the seventh transparent electrode 17 in the tenth embodiment shown in FIG. 34.

In the embodiments described above, the alignment film 8 is formed, in addition to the sixth transparent electrode 16 and the seventh transparent electrode 17. This makes it possible to more effectively absorb the ultraviolet light to be irradiated onto the oxide semiconductor layer 4, in order to prevent the threshold voltage of the oxide TFT from shifting.

Eleventh and Twelfth Embodiments

Figure 35A:
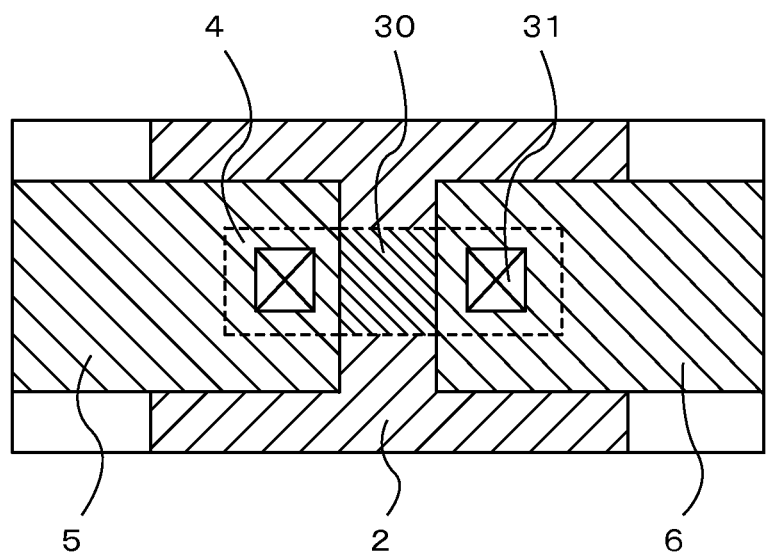
Figure 35B:
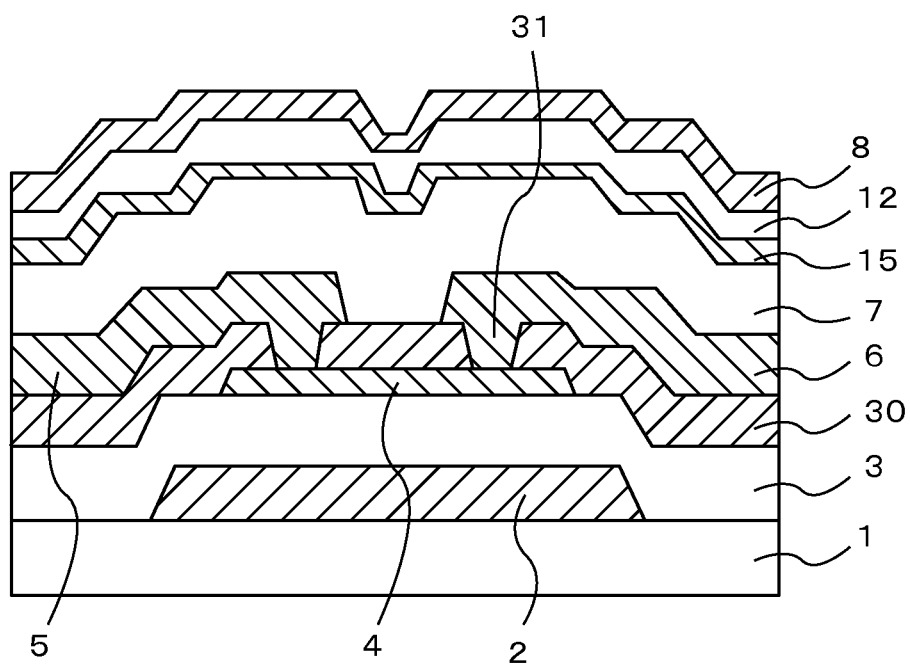
Figure 36A:
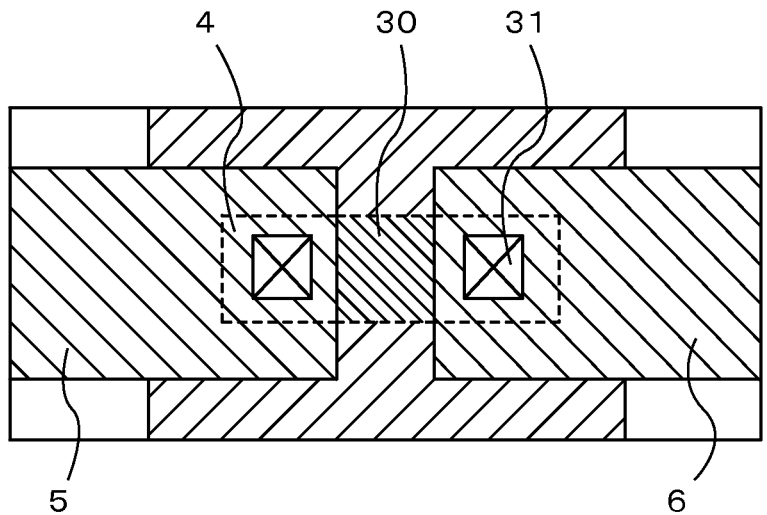
Figure 36B:
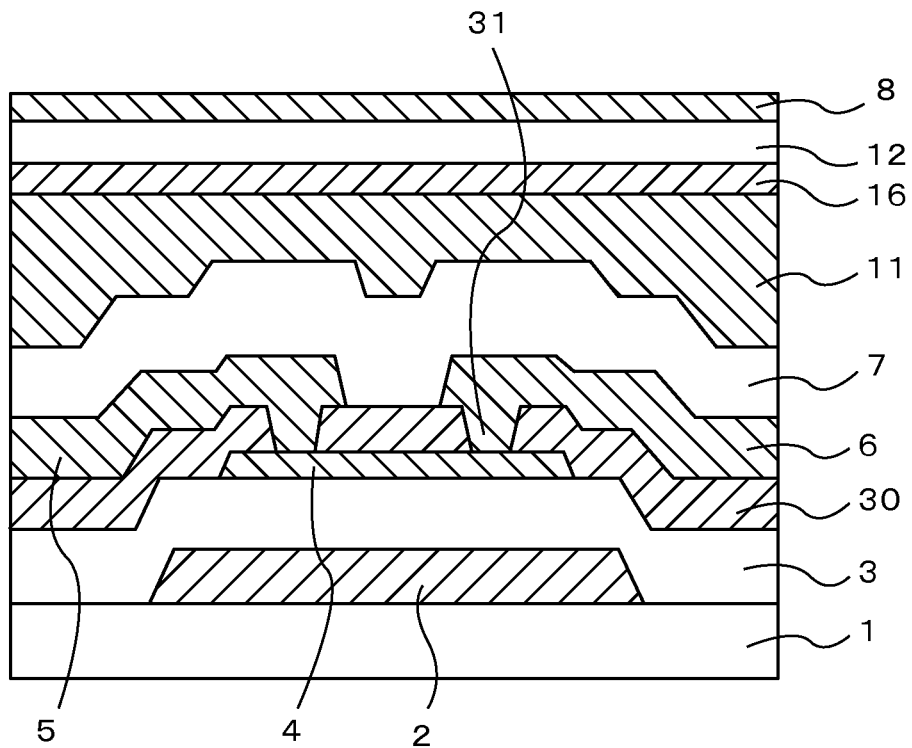

FIGS. 35A and 35B show the oxide TFT of the peripheral circuit portion SL according to an eleventh embodiment of the present invention. FIGS. 36A and 36B show the oxide TFT of the peripheral circuit portion SL according to a twelfth embodiment of the present invention. Note that FIG. 35A and FIG. 36A are plan views of the oxide TFT, and FIG. 35B and FIG. 36B are cross-sectional views of the oxide TFT. Further, in FIG. 35A and FIG. 36A, the gate insulating film 3, the protective layer 7, the alignment film 8, and the like are provided over the entire surface, but are omitted to clearly show the structure.

The eleventh and twelfth embodiments have a structure having an etching stopper layer 30. The basic structure of the eleventh embodiment is similar to that of the fourth embodiment. Further, the basic structure of the twelfth embodiment is similar to that of the eighth embodiment.

In the eleventh embodiment, the etching stopper layer 30 is formed so as to cover the oxide semiconductor layer 4. A contact hole 31 is formed in the etching stopper layer 30 to provide contact between the source and drain electrodes 5, 6 and the oxide semiconductor layer 4. Further, the inter-layer capacitive film 12 is formed between the fifth transparent electrode 15 and the alignment film 8.

In the present embodiment, the fifth transparent electrode 15 and the alignment film 8 can effectively absorb the ultraviolet light to be irradiated onto the oxide semiconductor layer 4, to prevent the threshold voltage of the oxide TFT from shifting.

Note that although not shown, a transparent electrode having an ultraviolet absorption capability may be provided, in addition to or instead of the alignment film 8.

In the twelfth embodiment, the etching stopper layer 30 is formed so as to cover the oxide semiconductor layer 4. Then, the contact hold 31 is formed in the etching stopper layer 30 to provide contact between the source and drain electrodes 5, 6 and the oxide semiconductor layer 4. The twelfth embodiment is different from the eleventh embodiment in that the organic flattening layer 11 is formed on the protective layer 7.

In the present embodiment, the sixth transparent electrode 16 and the alignment film 8 can effectively absorb the ultraviolet light to be irradiated onto the oxide semiconductor layer 4, to prevent the threshold voltage of the oxide TFT from shifting. Note that although not shown, another transparent electrode having an ultraviolet absorption capability may be provided, in addition to or instead of the alignment film 8.

Thirteenth Embodiment

Figure 37:
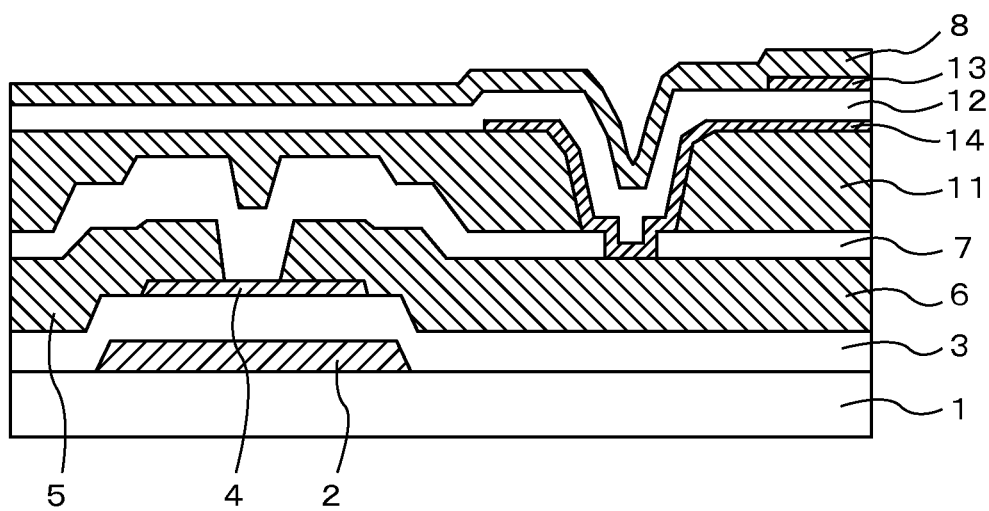
FIG. 37 is a view of an oxide TFT of the peripheral circuit according to a thirteenth embodiment of the present invention, which is a cross-sectional view of the oxide TFT.

FIG. 37 shows the structure of the oxide TFT according to a thirteenth embodiment of the present invention.

Note that similarly to the second embodiment, FIG. 37 shows the structure of the oxide TFT in the pixel portion PA corresponding to the A-A cross section of FIG. 5. The oxide TFT of the peripheral circuit portion SL according to the present invention also has the same structure.

The main difference from the second embodiment (see FIG. 25) is that the order of forming the third transparent electrode 13 and the fourth transparent electrode 14 is revered in the present embodiment.

In other words, in the present embodiment, the fourth transparent electrode 14 is formed on the organic flattering layer 11. Then, the fourth transparent electrode 14 is connected to the source electrode 6, and the third transparent electrode 13 is formed on the inter-layer capacitive film 12 to serve as a common electrode.

In the present embodiment, because of the formation process described above, at least one of the alignment film 8, the third transparent electrode 13, and the fourth transparent electrode 14 is formed so as to cover the oxide TFT also in the peripheral circuit portion SL.

Thus, it is possible to effectively absorb the ultraviolet light to be irradiated onto the oxide semiconductor layer 4, to prevent the shift of the threshold voltage of the oxide TFT configuring the peripheral circuit.

The present invention can be widely used for liquid crystal display panels using oxide TFT for the peripheral circuit. For example, the liquid crystal display panels can be used for display devices of portable information devices such as mobile phones, portable information terminals (PDAs), digital cameras, and multimedia players.

What is claimed is:

1. A liquid crystal display panel comprising:
   a transparent substrate provided with a pixel portion in which a plurality of pixel electrodes are arranged and a peripheral circuit portion provided outside of the pixel portion,
   a gate scanning circuit is formed in the peripheral circuit portion,
   a plurality of oxide thin film transistors formed in the gate scanning circuit to control the pixel electrodes in the pixel portion, and
   an alignment film to align a liquid crystal provided in the pixel portion,
   wherein the alignment film is subjected to photo alignment treatment by irradiation with ultraviolet light,
   wherein an ultraviolet absorbing layer for absorbing the ultraviolet light is provided so as to cover the plurality of oxide thin film transistors in the gate scanning circuit, and
   wherein the ultraviolet absorbing layer extends outwardly beyond the outer edge of the gate scanning circuit, and
   wherein the ultraviolet absorbing layer includes the alignment film and an oxide based transparent film.

2. The liquid crystal display panel according to claim 1, wherein the ultraviolet absorbing layer is formed by an oxide based transparent electrode formed in the same lamination process as the oxide based transparent electrode provided in the pixel portion.

3. The liquid crystal display panel according to claim 2, wherein the pixel electrode is configured by an oxide based transparent electrode, and
   wherein the ultraviolet absorbing layer is formed by the oxide based transparent electrode that is formed in the same process as the pixel electrode.

4. The liquid crystal display panel according to claim 2, wherein the pixel electrode is configured by an oxide based transparent electrode, and
   wherein the ultraviolet absorbing layer is formed in the same lamination process as an oxide based transparent electrode other than the oxide based transparent electrode configuring the pixel electrode in the pixel portion.

5. The liquid crystal display panel according to claim 3, wherein the ultraviolet absorbing layer is formed in the same lamination process as an oxide based transparent electrode other than the oxide based transparent electrode configuring the pixel electrode in the pixel portion.

6. The liquid crystal display panel according to claim 1, wherein the alignment film is provided through a protective layer above the plurality of oxide thin film transistors.

7. The liquid crystal display panel according to claim 1, wherein the alignment film is provided through an organic flattening layer above the oxide thin film transistor.

8. The liquid crystal display panel according to claim 1, wherein the alignment film is provided through an organic flattening layer and an inter-layer capacitive film above the oxide thin film transistor.

9. The liquid crystal display panel according to claim 1, wherein the ultraviolet absorbing layer is formed by an oxide based transparent electrode formed in the same lamination process as the oxide based transparent electrode provided in the pixel portion, and by an alignment film formed in the same lamination process as the alignment film provided in the pixel portion.

* * * * *